US009148823B2

(12) United States Patent
Forssell

(10) Patent No.: US 9,148,823 B2
(45) Date of Patent: Sep. 29, 2015

(54) ENSURING QUALITY OF SERVICE FOR PRIVATE SHORT-RANGE WIRELESS NETWORKS

(75) Inventor: Mika Forssell, Söderkulla (FI)

(73) Assignee: Nokia Technologies Oy, Espoo (FI)

(*) Notice: Subject to any disclaimer, the term of this patent is extended or adjusted under 35 U.S.C. 154(b) by 357 days.

(21) Appl. No.: 13/554,089

(22) Filed: Jul. 20, 2012

(65) Prior Publication Data
US 2012/0314571 A1 Dec. 13, 2012

Related U.S. Application Data

(63) Continuation-in-part of application No. 11/480,495, filed on Jul. 5, 2006, now Pat. No. 8,254,253.

(51) Int. Cl.
H04W 4/00 (2009.01)
H04W 28/24 (2009.01)
H04W 12/08 (2009.01)
H04L 29/06 (2006.01)
H04W 48/20 (2009.01)
H04W 84/04 (2009.01)
H04W 84/12 (2009.01)
H04W 48/14 (2009.01)

(52) U.S. Cl.
CPC .............. H04W 28/24 (2013.01); H04L 63/10 (2013.01); H04L 63/20 (2013.01); H04W 12/08 (2013.01); H04W 48/14 (2013.01); H04W 48/20 (2013.01); H04W 84/045 (2013.01); H04W 84/12 (2013.01)

(58) Field of Classification Search
CPC ..... H04W 84/12; H04W 88/08; H04W 12/08; H04W 64/00; H04W 76/02; H04W 92/02; H04W 48/18; H04W 48/14; H04W 48/16; H04W 84/045; H04W 88/06; H04W 48/20; H04W 48/06; H04W 28/0289; H04W 28/16; H04W 72/048; H04W 72/085; H04W 24/02; H04L 47/14; H04L 12/5695; H04L 47/824; H04L 47/805
USPC .............. 370/328, 338, 401, 229, 230, 230.1, 370/231, 232, 233, 234, 235; 455/414.1, 455/450, 451, 452.1, 452.2, 453, 454, 455, 455/410, 411; 709/223, 224, 225, 226, 227, 709/228, 229
See application file for complete search history.

(56) References Cited

U.S. PATENT DOCUMENTS

| 6,862,270 | B1 | 3/2005 | Ho |
| 6,978,144 | B1 | 12/2005 | Choksi |
| 6,985,439 | B2 | 1/2006 | Hosein |
| 7,010,305 | B2 | 3/2006 | Immonen et al. |
| 7,269,260 | B2 | 9/2007 | Adachi et al. |
| 7,436,766 | B2 | 10/2008 | Alfano et al. |

(Continued)

Primary Examiner — Olumide T Ajibade Akonai
(74) Attorney, Agent, or Firm — Locke Lord LLP

(57) ABSTRACT

A system manages the integration of a private short-range wireless network into a service/mobility domain with ensured quality of service. A server provides to wireless terminal devices, connection information including at least one of available quality of service (QoS), an indication of the access points, or an indication of services provided by one or more access points registered with the server. The server maintains information specifying a minimum quality of service (QoS) for first wireless terminal devices authorized for private network access, and rules for granting access to second wireless terminal devices authorized for shared network access, for one or more access points registered with the server.

16 Claims, 18 Drawing Sheets

(56) References Cited

U.S. PATENT DOCUMENTS

| | | |
|---|---|---|
| 7,522,518 B1* | 4/2009 | Satapathy .................... 370/229 |
| 7,916,691 B2 | 3/2011 | Kopplin |
| 2002/0075844 A1 | 6/2002 | Hagen |
| 2002/0151312 A1 | 10/2002 | Rosemarijn Bos et al. |
| 2003/0031129 A1 | 2/2003 | Dutkiewicz |
| 2004/0028017 A1* | 2/2004 | Whitehill et al. ............ 370/338 |
| 2004/0176075 A1 | 9/2004 | Schwarz et al. |
| 2004/0240463 A1 | 12/2004 | Ho et al. |
| 2004/0267551 A1* | 12/2004 | Yadav .............................. 705/1 |
| 2005/0048983 A1 | 3/2005 | Abraham et al. |
| 2005/0197148 A1 | 9/2005 | Ali et al. |
| 2005/0220019 A1 | 10/2005 | Melpignano |
| 2006/0045050 A1 | 3/2006 | Floros et al. |
| 2006/0094440 A1 | 5/2006 | Meier et al. |
| 2006/0268767 A1* | 11/2006 | Sato et al. .................... 370/328 |
| 2007/0002868 A1 | 1/2007 | Qian et al. |
| 2007/0249291 A1 | 10/2007 | Nanda et al. |
| 2007/0297358 A1 | 12/2007 | Chang et al. |

* cited by examiner

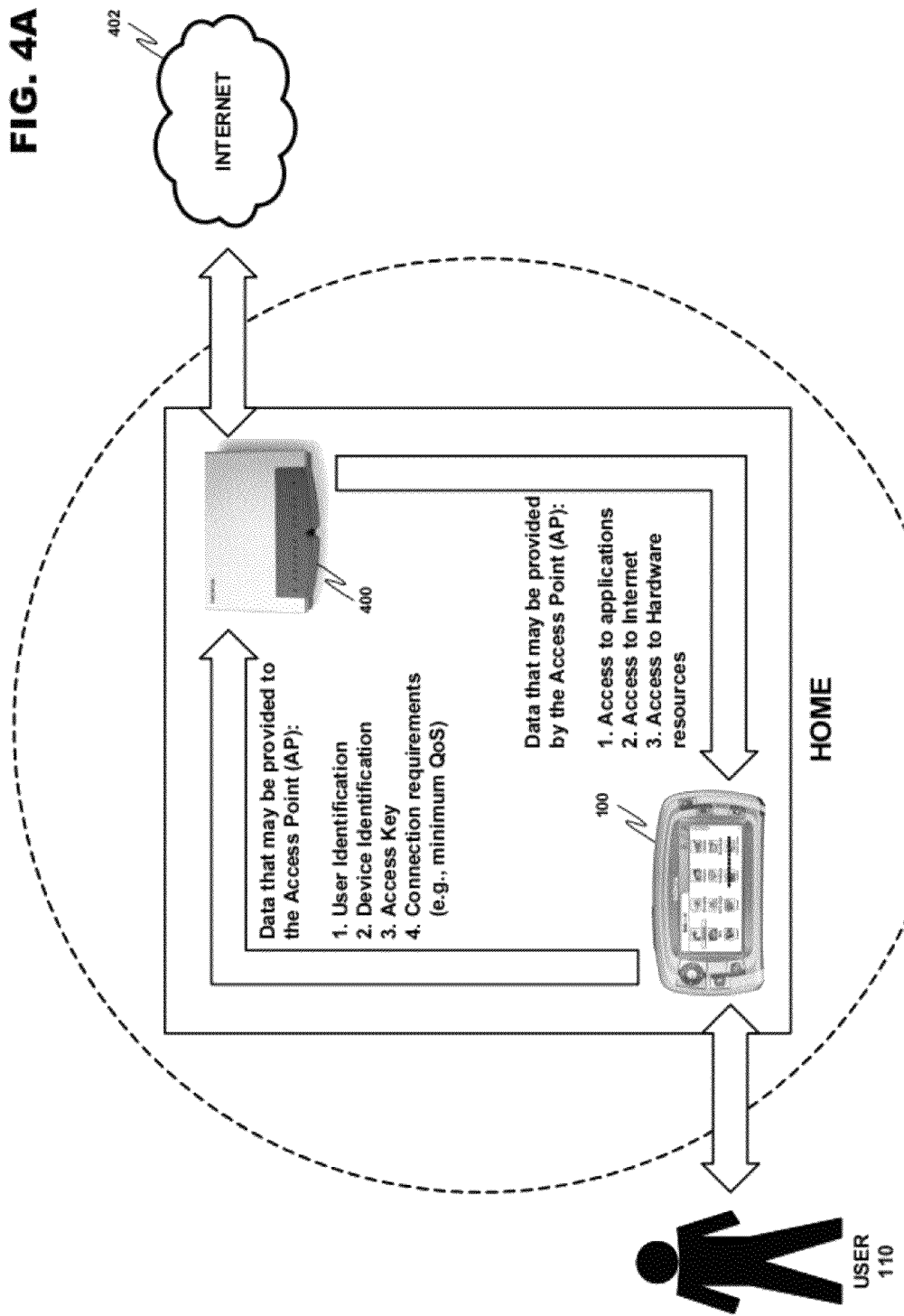

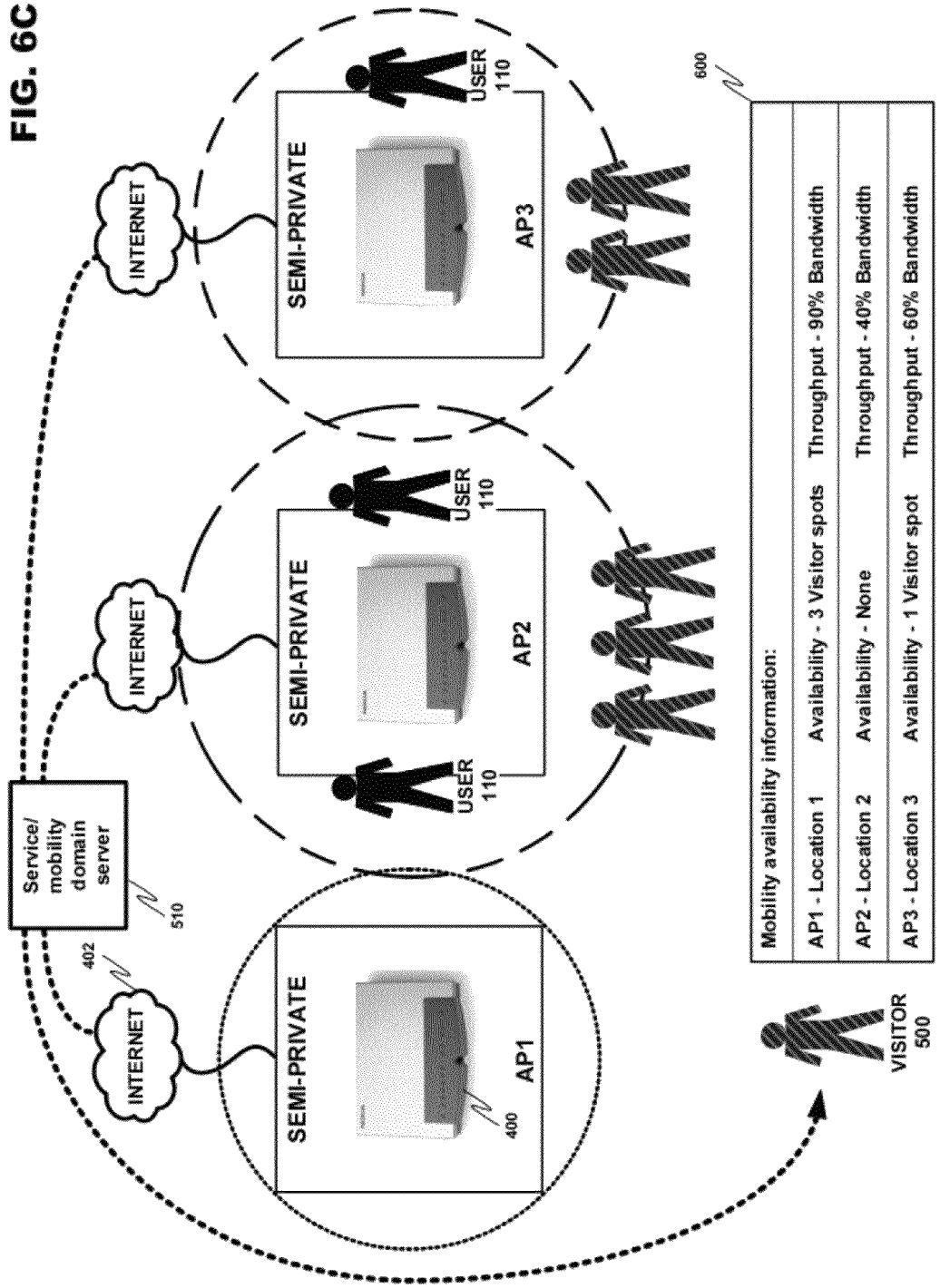

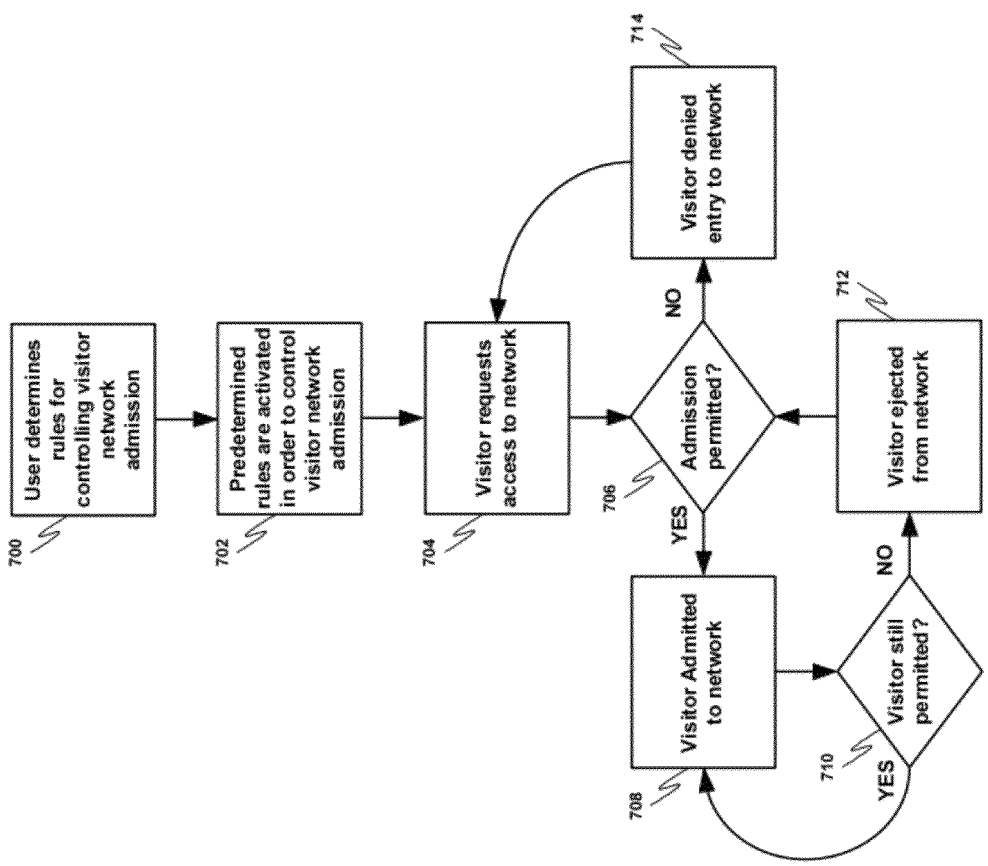

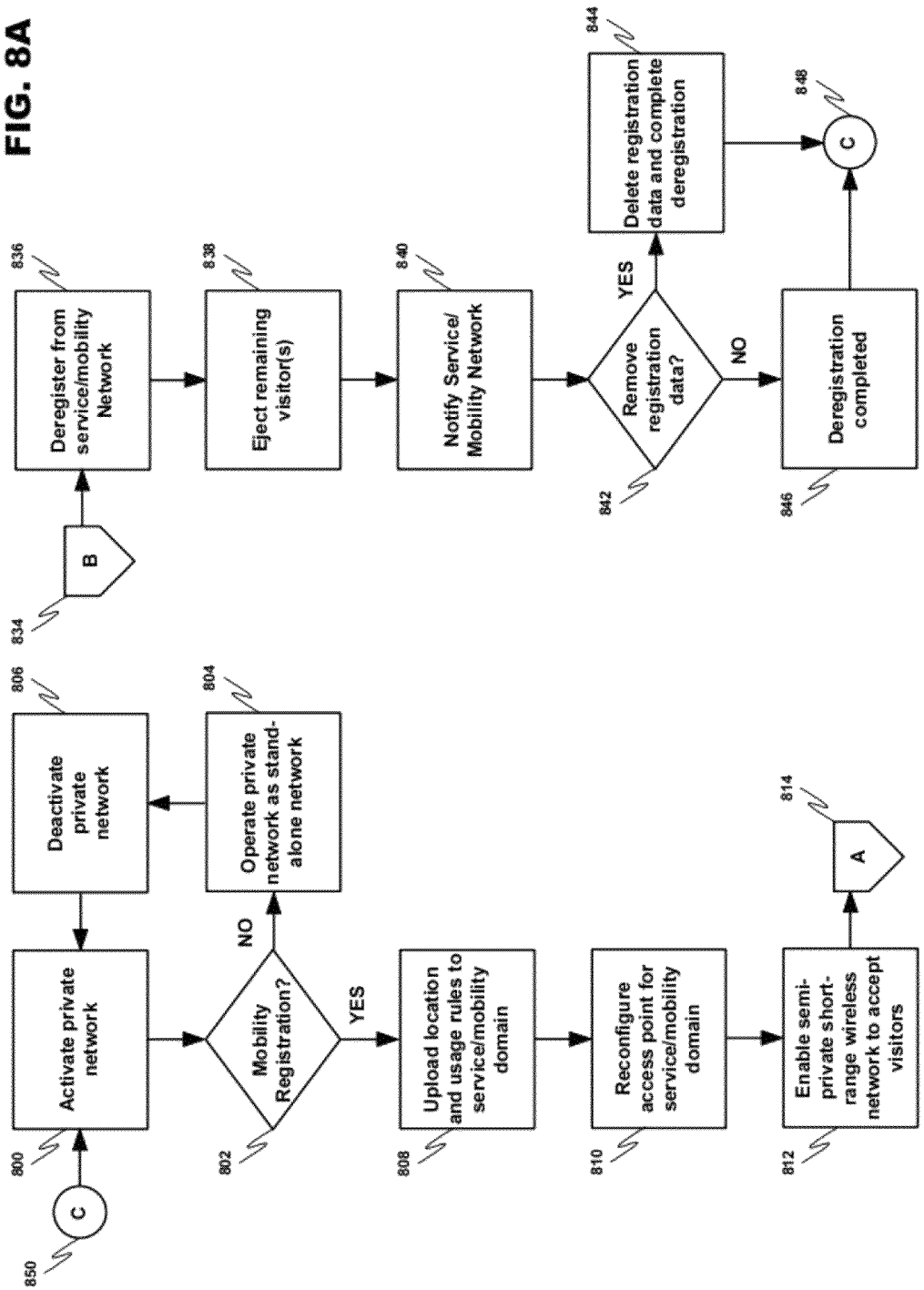

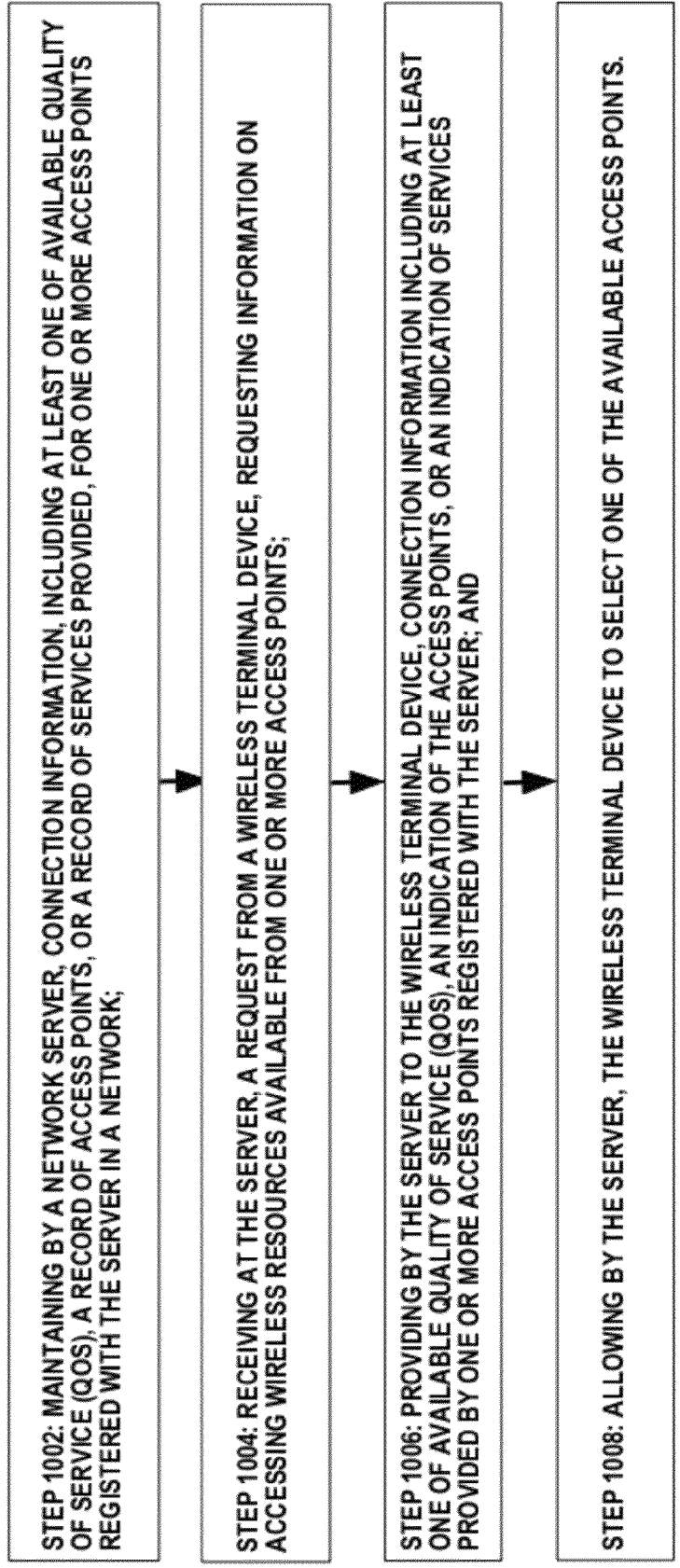

ENSURING QUALITY OF SERVICE FOR PRIVATE SHORT-RANGE WIRELESS NETWORKS

The present U.S. Patent Application is a Continuation-In-Part (CIP) of co-pending Parent U.S. patent application Ser. No. 11/480,495, filed Jul. 5, 2006, of which the entire disclosure is incorporated herein by reference. The Applicant claims benefit of the priority filing date of the co-pending Parent U.S. patent application Ser. No. 11/480,495, under 35 U.S.C. 120, for claims made in the present U.S. Patent Application, which are directed to the subject matter disclosed in the parent application.

BACKGROUND OF THE INVENTION

1. Field of Invention

The present invention relates to a system for providing resources to wireless communication devices, and more specifically to a system for controlling the admission policies of a registered short-range private wireless network in view of predetermined operational modes in order to create a semi-private access point enabled to conditionally admit visitor devices.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic (e.g., Quality of Service, or QoS, issues related to the large number of users) and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD may transmit and receive data rates from 720 Kbps up to 2-3 Mbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

The myriad of functionality previously described may be utilized to provide wireless service to WCD users regardless of their current location. In many cases, short-range wireless service is provided by a business or governmental entity (e.g., coffee shop, library, school, restaurant, etc.) for their patrons, allowing them to access the Internet or other related services while patronizing the establishment. However, short-range wireless network access is inherently limited in that it only covers a limited area. Users not patronizing the aforementioned establishments are frequently left with only the long-range wireless support for their networked applications (e.g., email, instant messaging, Voice Over Internet Protocol (VoIP), audio and video streaming, videoconferencing, FTP, etc.) While a viable solution, long-range wireless support may not work indoors, and may be subject to governmental regulation that perpetuates it as an expensive solution to utilize regularly.

Some enterprising businesses have sought to leverage private short-range wireless access point sharing in a communal format. For example, companies like OpenSpark Ltd. of Finland (http://open.sparknet.fi) are building a community of people willing to share access to their personal network in return for access to the short-range wireless networks of other users. In this way, a person might be able to access resources like the Internet from remote locations with no (or minimal) additional cost. A person's home access point (e.g., a wireless router) may also be accessed by other community members, making more efficient use of wireless bandwidth a user has already purchased to provide wireless broadband high-speed access while in the home.

There are both benefits and drawbacks to this system. An obvious benefit is the ability to access wireless resources via short-range communication in areas other than the home, effectively converting the sunk expense a user pays into a solution that provides much larger coverage. However, a user must allow other people to use their home system, which may cause problems of bandwidth depletion if multiple "visitors" are also logged on while a user is at home. There are also security considerations when computer-savvy users are granted access to a user's home system. The home user must be aware of the potential for attacks on their sensitive and/or confidential information when they are utilizing a wireless high-speed broadband connection in their home while simultaneously granting access to visiting wireless users.

What is therefore needed is a way to control the mode of a private short-range wireless network when it is being shared between a home user and various visiting users (visitors). The shared network should be able to identify when, for example, a home user is on the network, and should adjust its operation accordingly per predetermined operational rules. Further, the network should be able to identify when security concerns exist, and should be able to enter a safe mode in order to protect the sensitive and/or confidential information of the user.

SUMMARY OF INVENTION

The present invention includes at least a method, access point, terminal device, computer program, system and radio controller for managing the integration of a private short-range wireless network into a service/mobility domain. The private short-range wireless network may be converted into a semi-private short range wireless network by managing access to the network in accordance with predetermined rules. These rules may allow a home user to share the resources of a private short-range wireless network without worrying about bandwidth depletion or security issues.

A private short-range wireless network may consist of an access point (AP), or another wireless device, that supplies resources to a wireless communication device. When the AP is activated, a user may operate the AP in at least two configurations: (1) stand alone with local visitor access control, or (2) the user may register the availability of the device with a service/mobility domain server. Local visitor access control involves admitting/denying visitors based on predetermined rules set by the home user (e.g., the owner) of the AP. Registration, on the other hand, indicates to the service/mobility domain that visiting users may access the wireless resources of the AP, and in exchange, the home user may utilize other access points when roaming in order to obtain wireless resources. The registration process may also indicate identification information, location information, and one or more modes of operation for the AP.

Further, in at least the service/mobility domain embodiment of the invention, the AP may operate in at least two modes: a mode when a home user is present and using the AP, and another mode when the home user is not present. When the home user is present, restrictions based on measurable quality controls may be enforced to preserve a minimum required performance level for the user. Alternatively, when a home user is not present, these restrictions may be discontinued, and visitors may be able to utilize the full potential of the wireless connection. In addition, rules may exist in both modes of operation in order to preserve the security of the network. If a security rule is violated, the AP may revert to a safe mode in order to preserve the integrity of sensitive or confidential information owned by the home user.

In accordance with an example embodiment of the invention, a system manages the integration of a private short-range wireless network into a service/mobility domain with ensured quality of service. A server provides to wireless terminal devices, connection information including at least one of available quality of service (QoS), an indication of the access points, or an indication of services provided by one or more access points registered with the server. The server maintains information specifying a minimum quality of service (QoS) for first wireless terminal devices authorized for private network access, and rules for granting access to second wireless terminal devices authorized for shared network access, for one or more access points registered with the server.

In an example embodiment of the invention a method for a server ensuring quality of service comprises:

maintaining by a network server, connection information, including at least one of available quality of service, a record of access points, or a record of services provided, for one or more access points registered with the server in a network;

receiving at the server, a request from a wireless terminal device, requesting information on accessing wireless resources available from one or more access points;

providing by the server to the wireless terminal device, connection information including at least one of available quality of service, an indication of the access points, or an indication of services provided by one or more access points registered with the server; and allowing by the server, the wireless terminal device to select one of the available access points.

In an example embodiment of the invention a method for a server ensuring quality of service comprises:

transmitting by the server, a command to the wireless terminal device to select one of the access points.

In an example embodiment of the invention a method for a server ensuring quality of service comprises:

wherein the server receives the request from the wireless terminal device over at least one of a long-range wireless communications link or over a short-range wireless communications link via an access point.

In an example embodiment of the invention a method for a server ensuring quality of service comprises:

wherein the network server maintains information specifying a minimum quality of service for first wireless terminal devices authorized for private network access, and rules for granting access to second wireless terminal devices authorized for shared network access, for one or more access points registered with the server;

denying by the server, access to one or more access points for the wireless terminal device upon detection of at least one of a security condition, a lack of sufficient credentials for the user of the wireless terminal device to access the one or more access points, or insufficient availability of quality of service, based on the rules, if the wireless terminal device is a second wireless terminal device.

In an example embodiment of the invention a method for a server ensuring quality of service comprises:

wherein the network is a short-range communications network including at least a Bluetooth network, BluLite network, WLAN network, UWB network, Zigbee network, UHF RFID network, or Wireless USB.

In an example embodiment of the invention a method for a server ensuring quality of service comprises:

enabling by a server, a wireless network to deliver resources for at least two classes of devices including home devices and visitor devices;

detecting by the server, one or more wireless devices within a coverage area of the wireless network;

identifying by the server, each of the one or more detected wireless devices as a home device or a visitor device;

determining by the server, admission behavior for the wireless network, the admission behavior ensuring minimum quality of service for home devices, comprising how wireless resources will be allocated between home and visitor devices based on predetermined rules requiring a minimum quality of service level for home devices; and reducing by the server, quality of service for visitor devices when at least one home device is present and not receiving the minimum quality of service.

In an example embodiment of the invention a method for a server ensuring quality of service comprises:

increasing by the server, quality of service for visitor devices when home devices are not using the wireless network.

In an example embodiment of the invention a method for a server ensuring quality of service comprises:

wherein the network is a short-range communications network including at least a Bluetooth network, BluLite network, WLAN network, UWB network, Zigbee network, UHF RFID network, or Wireless USB.

In an example embodiment of the invention an apparatus for a server ensuring quality of service comprises:

at least one processor;

at least one memory including computer program code;

the at least one memory and the computer program code configured to, with the at least one processor, cause the apparatus at least to:

maintain connection information, including at least one of available quality of service, a record of access points, or a record of services provided, for one or more access points registered with the apparatus;

receive a request from a wireless terminal device, requesting information on accessing wireless resources available from one or more access points;

provide to the wireless terminal device, connection information including at least one of available quality of service, an indication of the access points, or an indication of services provided by one or more access points registered with the apparatus; and allow the wireless terminal device to select one of the available access points.

In an example embodiment of the invention an apparatus for a server ensuring quality of service comprises:

the at least one memory and the computer program code configured to, with the at least one processor, cause the apparatus at least to:

transmit a command to the wireless terminal device to select one of the access points.

In an example embodiment of the invention an apparatus for a server ensuring quality of service comprises:

wherein the apparatus receives the request from the wireless terminal device over at least one of a long-range wireless communications link or over a short-range wireless communications link via an access point.

In an example embodiment of the invention an apparatus for a server ensuring quality of service comprises:

wherein the apparatus maintains information specifying a minimum quality of service for first wireless terminal devices authorized for private network access, and rules for granting access to second wireless terminal devices authorized for shared network access, for one or more access points registered with the apparatus;

the at least one memory and the computer program code configured to, with the at least one processor, cause the apparatus at least to:

deny access to one or more access points for the wireless terminal device upon detection of at least one of a security condition, a lack of sufficient credentials for the user of the wireless terminal device to access the one or more access points, or insufficient availability of quality of service, based on the rules, if the wireless terminal device is a second wireless terminal device.

In an example embodiment of the invention an apparatus for a server ensuring quality of service comprises:

at least one processor;

at least one memory including computer program code;

the at least one memory and the computer program code configured to, with the at least one processor, cause the apparatus at least to:

enable a wireless network to deliver resources for at least two classes of devices including home devices and visitor devices;

detect one or more wireless devices within a coverage area of the wireless network;

identify each of the one or more detected wireless devices as a home device or a visitor device;

determine admission behavior for the wireless network, the admission behavior ensuring minimum quality of service for home devices, comprising how wireless resources will be allocated between home and visitor devices based on predetermined rules requiring a minimum quality of service level for home devices; and reduce quality of service for visitor devices when at least one home device is present and not receiving the minimum quality of service.

In an example embodiment of the invention an apparatus for a server ensuring quality of service comprises:

increase quality of service for visitor devices when home devices are not using the wireless network.

In an example embodiment of the invention computer program product for a server ensuring quality of service comprises:

computer executable program code recorded on a computer readable, non-transitory storage medium, the computer executable program code comprising:

code for maintaining by a network server, connection information, including at least one of available quality of service, a record of access points, or a record of services provided, for one or more access points registered with the server;

code for receiving at the server, a request from a wireless terminal device, requesting information on accessing wireless resources available from one or more access points;

code for providing by the server to the wireless terminal device, connection information including at least one of available quality of service, an indication of the access points, or an indication of services provided by one or more access points registered with the server; and code for allowing by the server, the wireless terminal device to select one of the available access points.

In an example embodiment of the invention computer program product for a server ensuring quality of service comprises:

computer executable program code recorded on a computer readable, non-transitory storage medium, the computer executable program code comprising:

code for enabling by a server, a wireless network to deliver resources for at least two classes of devices including home devices and visitor devices;

code for detecting by the server, one or more wireless devices within a coverage area of the wireless network;

code for identifying by the server, each of the one or more detected wireless devices as a home device or a visitor device;

code for determining by the server, admission behavior for the wireless network, the admission behavior ensuring minimum quality of service for home devices, comprising how wireless resources will be allocated between home and visitor devices based on predetermined rules requiring a minimum quality of service level for home devices; and code for reducing by the server, quality of service for visitor devices when at least one home device is present and not receiving the minimum quality of service.

In an example embodiment of the invention computer program product for a server ensuring quality of service comprises:

code for increasing by the server, quality of service for visitor devices when home devices are not using the wireless network.

In an example embodiment of the invention a method for a wireless terminal obtaining ensured quality of service comprises:

transmitting, by a wireless terminal device, through an access point to a network management server, a request for information on accessing wireless resources available from one or more access points in a network;

receiving by the wireless terminal device, connection information including at least one of available quality of service, a record of access points, or a record of services provided, for one or more access points registered with the server, if the wireless terminal device is a first device and a quality of service is available for the one or more access points, that is equal to or greater than a minimum quality of service;

receiving by the wireless terminal device, connection information including at least one of available quality of service, a record of access points, or a record of services provided, for one or more access points registered with the server, if the wireless terminal device is a second device, based on rules for granting access to second wireless terminal devices; and receiving by the wireless terminal device, a denial by the server, of access to one or more access points upon detection of at least one of a security condition, a lack of sufficient credentials for the user of the wireless terminal device to access the one or more access points, or insufficient availability of quality of service, based on the rules, if the wireless terminal device is a second device.

In an example embodiment of the invention a method for a wireless terminal obtaining ensured quality of service comprises:

wherein the wireless terminal device transmits the request to the server over at least one of a long-range wireless communications link or over a short-range wireless communications link via an access point.

In an example embodiment of the invention a method for a wireless terminal obtaining ensured quality of service comprises:

wherein the minimum quality of service is provided by an access point for first wireless terminal devices connected to the access point and a remaining portion of available bandwidth is provided by the access point for second wireless terminal devices connected to the access point, based on at least one of rules or an agreement between an owner of the access point and a service provider.

In an example embodiment of the invention a method for a wireless terminal obtaining ensured quality of service comprises:

wherein the network is a short-range communications network including at least a Bluetooth network, BluLite network, WLAN network, UWB network, Zigbee network, UHF RFID network, or Wireless USB.

In an example embodiment of the invention an apparatus for a wireless terminal obtaining ensured quality of service comprises:

at least one processor;
at least one communication module;
at least one memory including computer program code;
the at least one memory and the computer program code configured to, with the at least one processor, cause the apparatus at least to:

transmit through an access point to a network management server, a request for information on accessing wireless resources available from one or more access points;

receive connection information including at least one of available quality of service, a record of access points, or a record of services provided, for one or more access points registered with the server, if the apparatus is a first device and a quality of service is available for the one or more access points, that is equal to or greater than a minimum quality of service;

receive connection information including at least one of available quality of service, a record of access points, or a record of services provided, for one or more access points registered with the server, if the apparatus is a second device, based on rules for granting access to second wireless terminal devices; and receive a denial by the server, of access to one or more access points upon detection of at least one of a security condition, a lack of sufficient credentials for the user of the wireless terminal device to access the one or more access points, or insufficient availability of quality of service, based on the rules, if the wireless terminal device is a second device.

In an example embodiment of the invention an apparatus for a wireless terminal obtaining ensured quality of service comprises:

wherein the apparatus transmits the request to the server over at least one of a long-range wireless communications link or over a short-range wireless communications link via an access point.

In an example embodiment of the invention an apparatus for a wireless terminal obtaining ensured quality of service comprises:

wherein the minimum quality of service is provided by an access point for first wireless terminal devices connected to the access point and a remaining portion of available bandwidth is provided by the access point for second wireless terminal devices connected to the access point, based on at least one of rules or an agreement between an owner of the access point and a service provider.

In an example embodiment of the invention a computer program product for a wireless terminal obtaining ensured quality of service comprises:

computer program product comprising computer executable program code recorded on a computer readable, non-transitory storage medium, the computer executable program code comprising:

code for transmitting, by a wireless terminal device, through an access point to a network management server, a request for information on accessing wireless resources available from one or more access points;

code for receiving by the wireless terminal device, connection information including at least one of available quality of service, a record of access points, or a record of services provided, for one or more access points registered with the server, if the wireless terminal device is a first device and a quality of service is available for the one or more access points, that is equal to or greater than a minimum quality of service;

code for receiving by the wireless terminal device, connection information including at least one of available quality of service, a record of access points, or a record of services provided, for one or more access points registered with the server, if the wireless terminal device is a second device, based on rules for granting access to second wireless terminal devices; and code for receiving by the wireless terminal device, a denial by the server, of access to one or more access points upon detection of at least one of a security condition, a lack of sufficient credentials for the user of the wireless terminal device to access the one or more access points, or insufficient availability of quality of service, based on the rules, if the wireless terminal device is a second device.

DESCRIPTION OF DRAWINGS

The invention will be further understood from the following detailed description of a preferred embodiment, taken in conjunction with appended drawings, in which:

FIG. 4A discloses exemplary access and service information exchanged by an access point and a user in accordance with at least one embodiment of the present invention.

FIG. 6C discloses exemplary semi-private short-range wireless networks in various modes in accordance with the disclosure of FIG. 6A.

FIG. 7 discloses a flow chart describing exemplary local visitor access control in a stand-alone wireless network in accordance with at least one embodiment of the present invention.

FIG. 8A discloses a flow chart describing exemplary registration and deregistration processes in accordance with at least one embodiment of the present invention.

FIG. 10A is an example flow diagram of an example embodiment of a method for a server 510 ensuring quality of service, in accordance with an example embodiment of the invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks.

Figure 1:
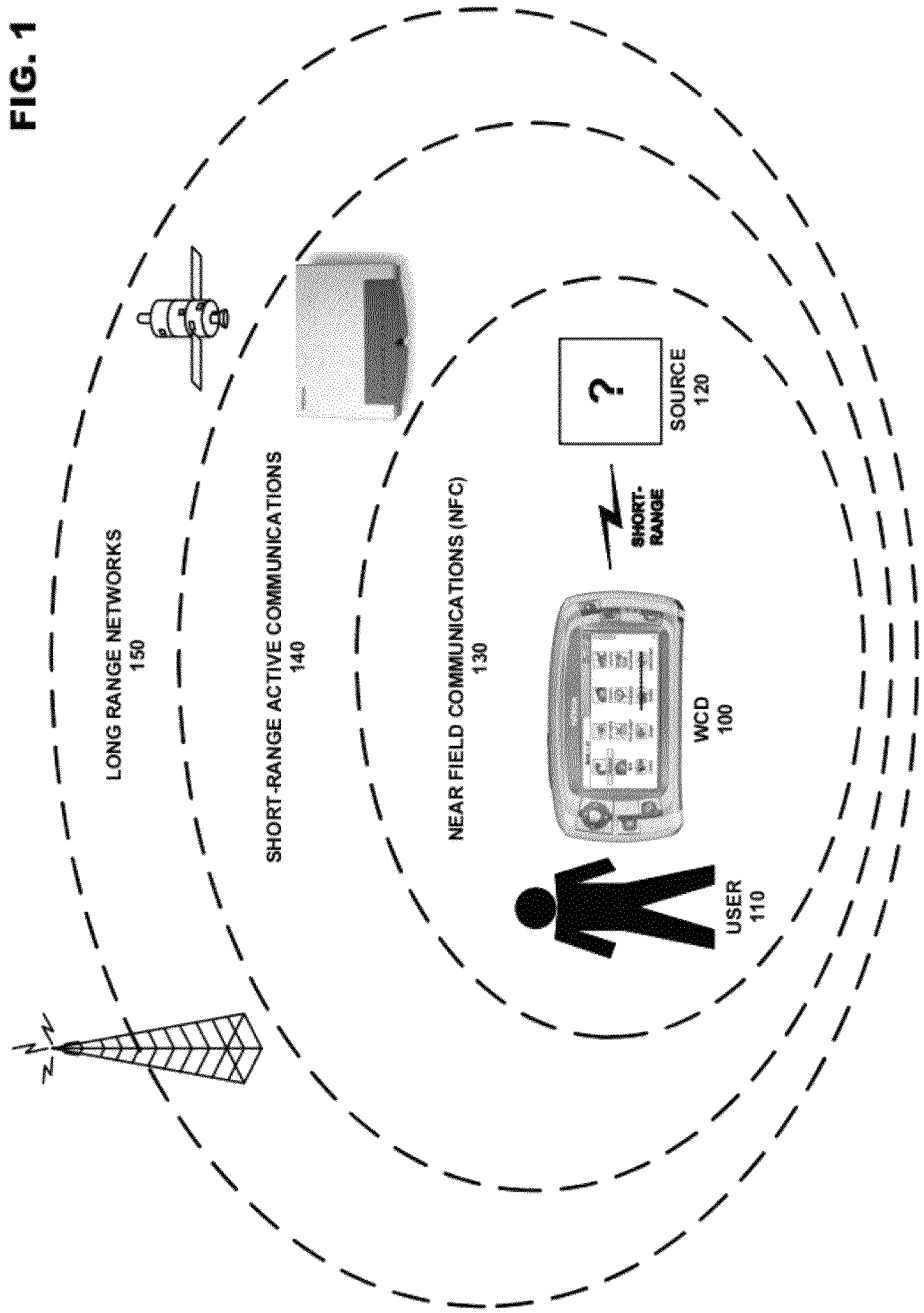
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communications (NFC) 130 include various transponder-type interactions wherein normally only the scanning device requires its own power source. WCD 100 scans source 120 via short-range communications. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from 96 bits to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communications. Short-range active communications 140 includes applications wherein the sending and receiving devices are both active. An exemplary situation would include user 110 coming within effective transmission range of a Bluetooth™, WLAN, UWB, WUSB, etc. access point. The amount of information to be conveyed is unlimited, except that it must all be transferred in the time when user 110 is within effective transmission range of the access point. This duration is extremely limited if the user is, for example, strolling through a shopping mall or walking down a street. Due to the higher complexity of these wireless networks, additional time is also required to establish the initial connection to WCD 100, which may be increased if there are many devices queued for service in the area proximate to the access point. The effective transmission range of these networks depends on the technology, and may be from 32 ft. to over 300 ft.

Long-range networks 150 are used to provide virtually uninterrupted communication coverage for WCD 100. Land-based radio stations or satellites are used to relay various communications transactions worldwide. While these systems are extremely functional, the use of these systems are often charged on a per-minute basis to user 110, not including additional charges for data transfer (e.g., wireless Internet access). Further, the regulations covering these systems cause additional overhead for both the users and providers, making the use of these systems more cumbersome.

In view of the above, it becomes easy to understand the need for a variety of different communication resources combined into a single WCD. Since these types of devices are being used as replacements for a variety of conventional communications means, including land-line telephones, low-functionality cellular handsets, laptops enabled with wireless communications, etc., the devices must be able to easily adapt to a variety of different applications (e.g., voice communications, business programs, GPS, Internet communications, etc.) in a variety of different environments (e.g. office, automobile, outdoors, arenas, shops, etc.)

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
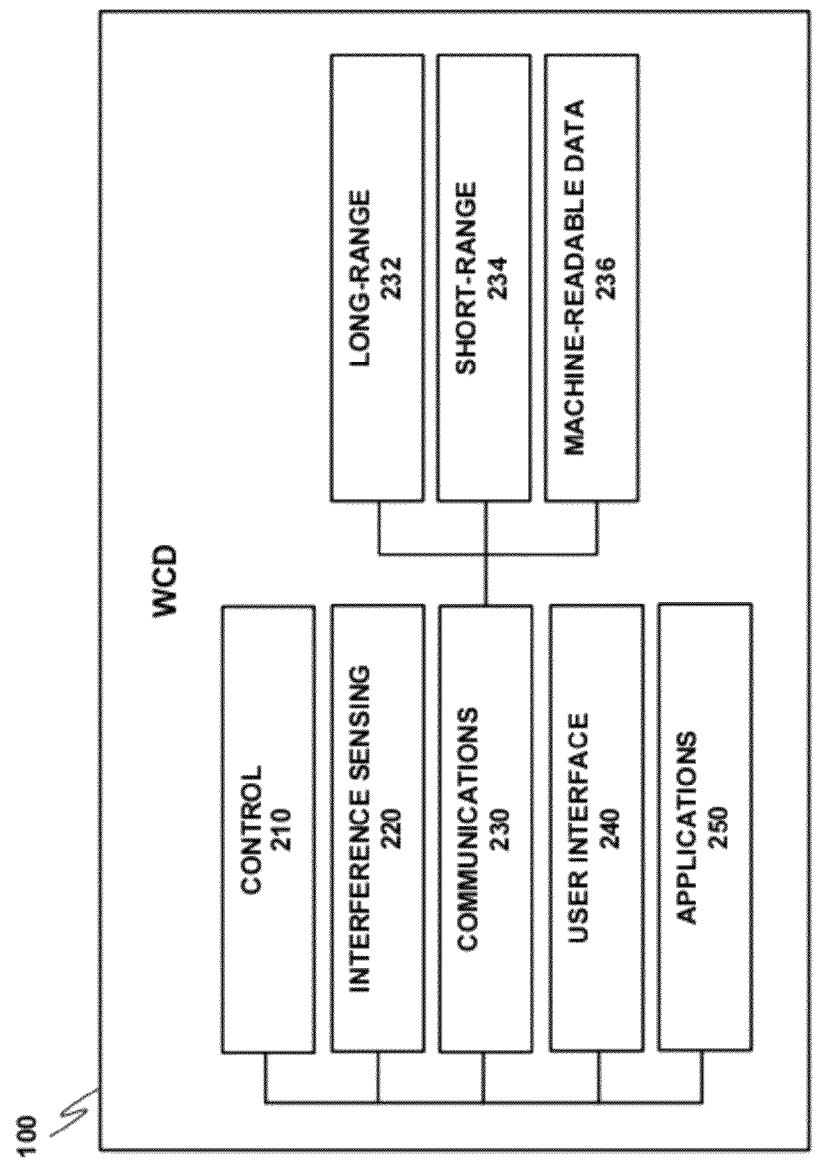
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communications aspects of WCD 100. As shown in FIG. 2, communications module 230 may include, for example, long-range communications module 232, short-range communications module 234 and machine-readable data module 236 (e.g., for NFC). Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
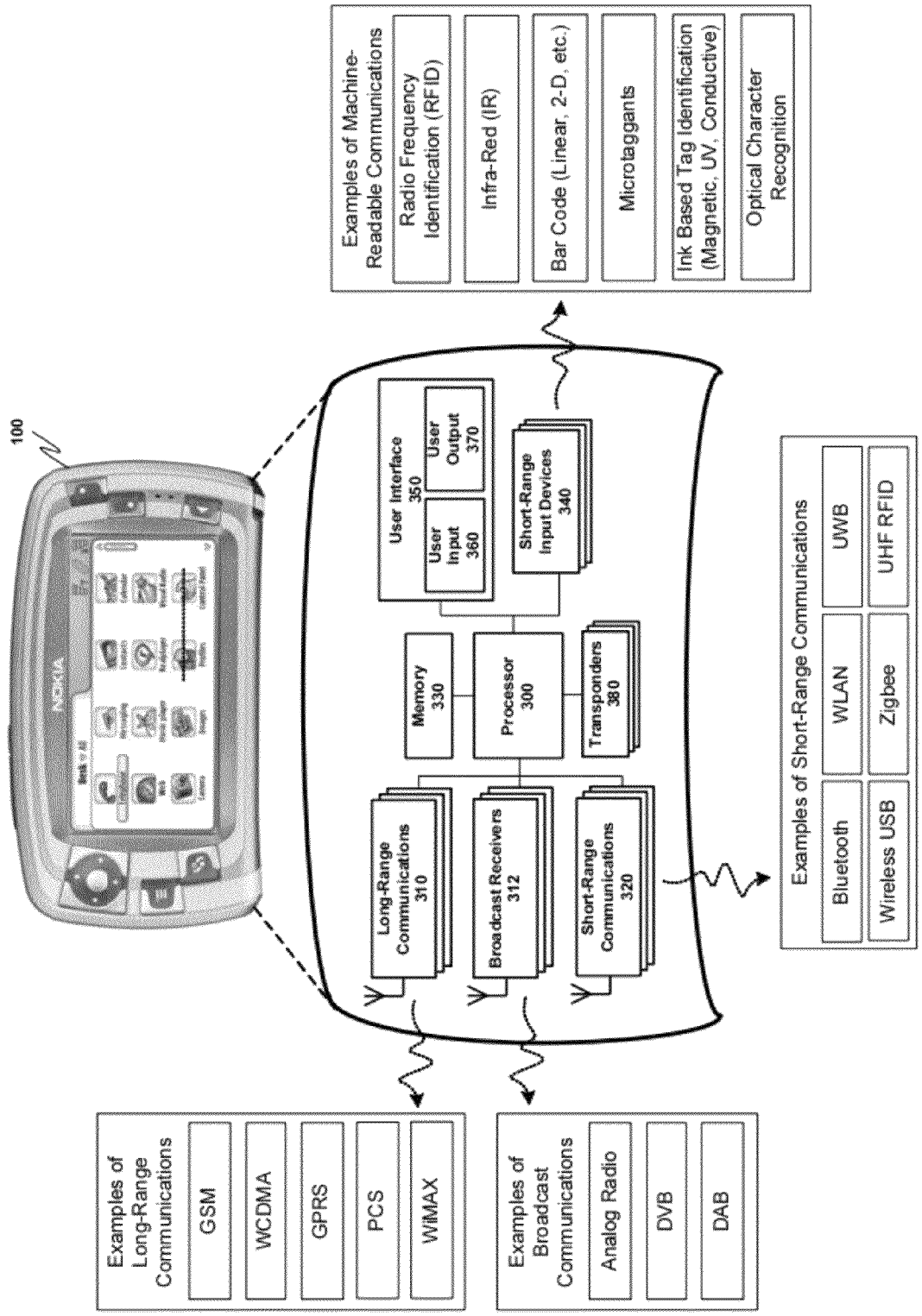
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to communications sections 310, 312, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 312, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. As disclosed in FIG. 3, Long-range communications 310 may be composed of one or more subsystems supporting various long-range communications mediums. These subsystems may, for example, be radio modems enabled for various types of long-range wireless communication.

As a subset of long-range communications 310, or alternatively operating as an independent module separately connected to processor 300, broadcast receivers 312 allows WCD 100 to receive transmission messages via mediums such as Analog Radio, Digital Video Broadcast for Handheld Devices (DVB-H), Digital Audio Broadcasting (DAB), etc. These transmissions may be encoded so that only certain designated receiving devices may access the transmission content, and may contain text, audio or video information. In at least one example, WCD 100 may receive these transmissions and use information contained within the transmission signal to determine if the device is permitted to view the received content. As in the case of long-range communications 310, broadcast receivers 312 may be comprised of one or more radio modems utilized to receive a variety of broadcast information.

Short-range communications 320 is responsible for functions involving the exchange of information across short-range wireless networks. As described above and depicted in FIG. 3, examples of such short-range communications 320 are not limited to Bluetooth™, BluLite, WLAN, UWB, Zigbee, UHF RFID, and Wireless USB connections. Accordingly, short-range communications 320 performs functions related to the establishment of short-range connections, as well as processing related to the transmission and reception of information via such connections. Short-range communications 320 may be composed of one or more subsystem made up of, for example, various radio modems employed to communicate via the previously indicated assortment of short range wireless mediums.

Short-range input device 340, also depicted in FIG. 3, may provide functionality related to the short-range scanning of machine-readable data (e.g., for NFC). For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include a multitude of optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device which may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

III. Private Short-Range Wireless Network Access Control

The following disclosure makes reference to a wireless communication device (WCD) receiving wireless resources from an access point (AP). While an AP is utilized as the information distribution device for the sake of explanation in the specification, the present invention is not strictly limited to this interaction, and may also encompass communications between any two or more devices capable of wireless communication. As an example of other applicable wireless transactions, a network may be established ad-hoc between at least two WCDs, wherein one WCD may act as an information providing device delivering data to one or more other WCDs. These types of communications may be readily enabled in various short-range wireless communication mediums such those previously described.

Referring now to FIG. 4A, exemplary access and service information exchanged between a home user (hereafter referred to as "user 110") and a private network formed by a wireless access point is disclosed in accordance with at least one embodiment of the present invention. User 110 may utilize WCD 100 in order to wirelessly transact with AP 400, which in turn may be connected to a broadband connection (depicted as Internet 402 in FIG. 4A). AP 400 may be accessed by any of the aforementioned wireless communication mediums, and may be connected to Internet 400 through either a wired or wireless connection. Further, it is presumed in this example that user 110 is a regular or ordinary user of this network (e.g., this is a private network maintained by user 110 for personal use in their home, office, etc.)

In order to initiate a transaction, User 110 may first provide identification information to AP 400. Identification information may include user information, device information, access key information, connection requirements (e.g., minimum QoS levels), etc. that AP 400 may analyze in order to determine if WCD 100 should be admitted to the wireless network. The user information may include names, numbers or strings that indicate an account or identity of user 110.

Device identification information may indicate a manufacturer, registration and/or serial number for a particular WCD 100. Further, this information may take the form of either public information, accessible by any device communicating with WCD 100, or secret information known only to certain devices. WCD 100 may deliver secret information (for example, by encrypted transmission) to AP 400 automatically or by request. AP 400 may then compare the received information to the secret information of known users to determine if WCD 100 should be permitted access.

If admission to the wireless network is granted, AP 400 may provide wireless resources to WCD 100. These services may include support for certain applications (e.g., email, instant messaging, VoIP, teleconferencing, videoconferencing, audio and/or video streaming FTP, etc.), access to a limited network, such as service providers Intranet, access to the Internet, access to hardware resources such as backup storage (hard drives, tape media, etc.), printers, etc. These resources may be used to execute various tasks on WCD 100, or in another example, may be used to output information from WCD 100 to another medium, such as printing out information on paper.

Figure 4B:
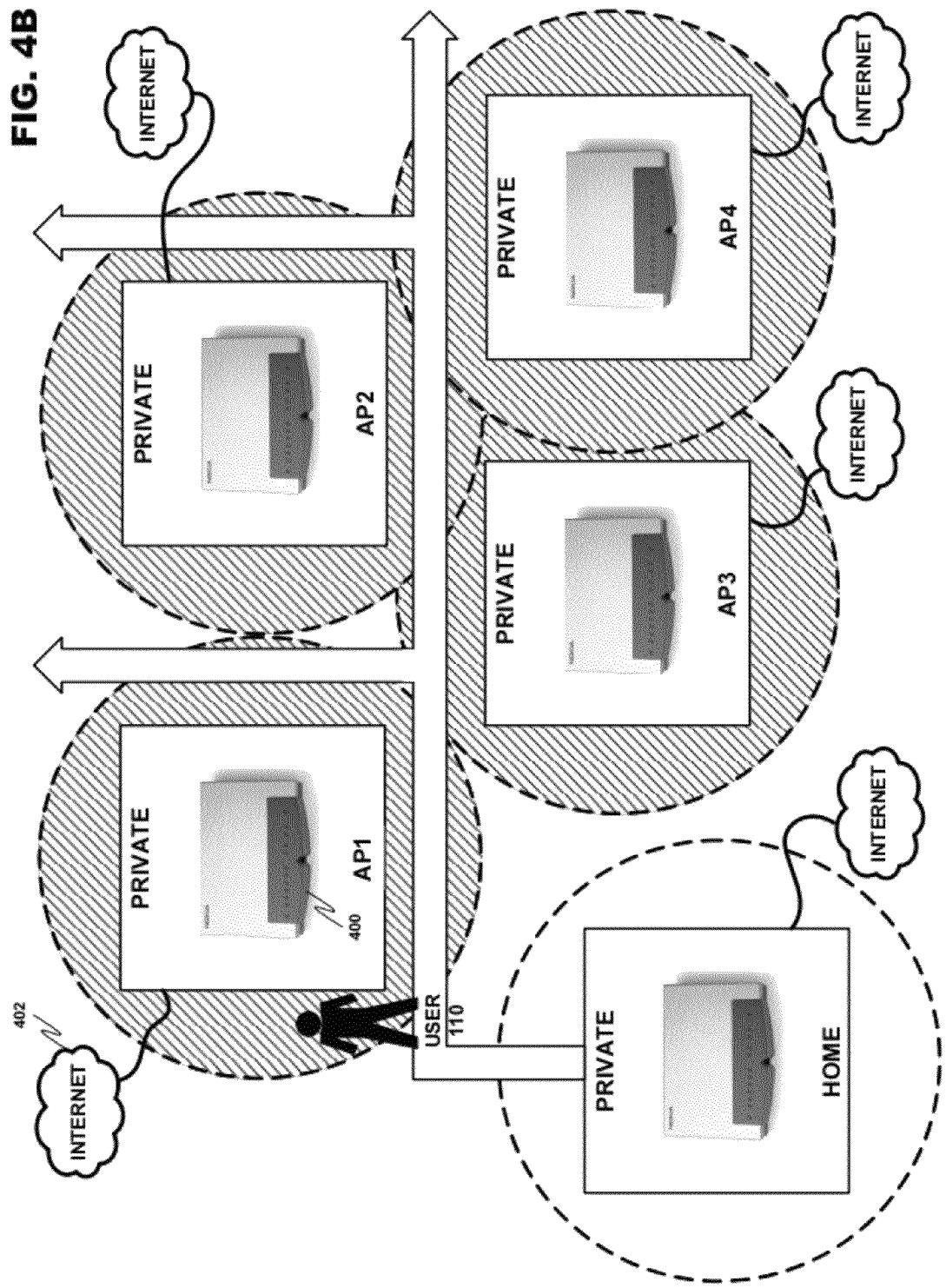
FIG. 4B discloses an example of a user being denied access to private short-range wireless networks in accordance with at least one embodiment of the present invention.

FIG. 4B shows an exemplary situation wherein user 110 may venture out of the effective transmission range (indicated as a dotted circle in the figures) of home AP 400 and encounter other short-range wireless networks, such as AP1-AP4 in FIG. 4B. Similar to FIG. 4A, in each network AP 400 may include at least a wired and/or wireless broadband connection to Internet 402 (which may, in all cases, include a more limited network, such as service providers Intranet) in order to provide wireless resources to encountered devices. However, in many cases user 110 may be limited to only accessing their personally maintained home network.

When user 110 ventures out of effective transmission range of the home network, other private wireless networks AP1-AP4 may be encountered. However, these networks may include access points 400 maintained by people who have secured the networks in order to prevent people like user 110 from gaining access. These secured networks are indicated by circles including a hashed-out area (//////) in FIG. 4B. As a result, user 110 may roam and encounter networks, but will not be able to gain access, and hence any wireless resources, from these various access points 400.

IV. Semi-Private Short-Range Wireless Network Access Control

In accordance with at least one embodiment of the present invention, visitors 500 (e.g., people not owning and/or maintaining a particular wireless network to which access is desired) may gain conditional access to private/secured networks based upon the current operational mode of a given network. The AP 400 may be converted from a stand-alone private wireless network to a semi-private wireless network through, for example: (1) user configuration of local visitor access control in a stand-alone network, or (2) membership in a service/mobility domain. Through membership, user 110 may create a compromise wherein resources from a private wireless network may be shared in exchange for the right to utilize wireless resources from the wireless access points 400 of other users. In this way, user 110 may still be able to obtain short-range wireless network support while roaming outside of the effective transmission range of their home private wireless network.

Figure 5A:
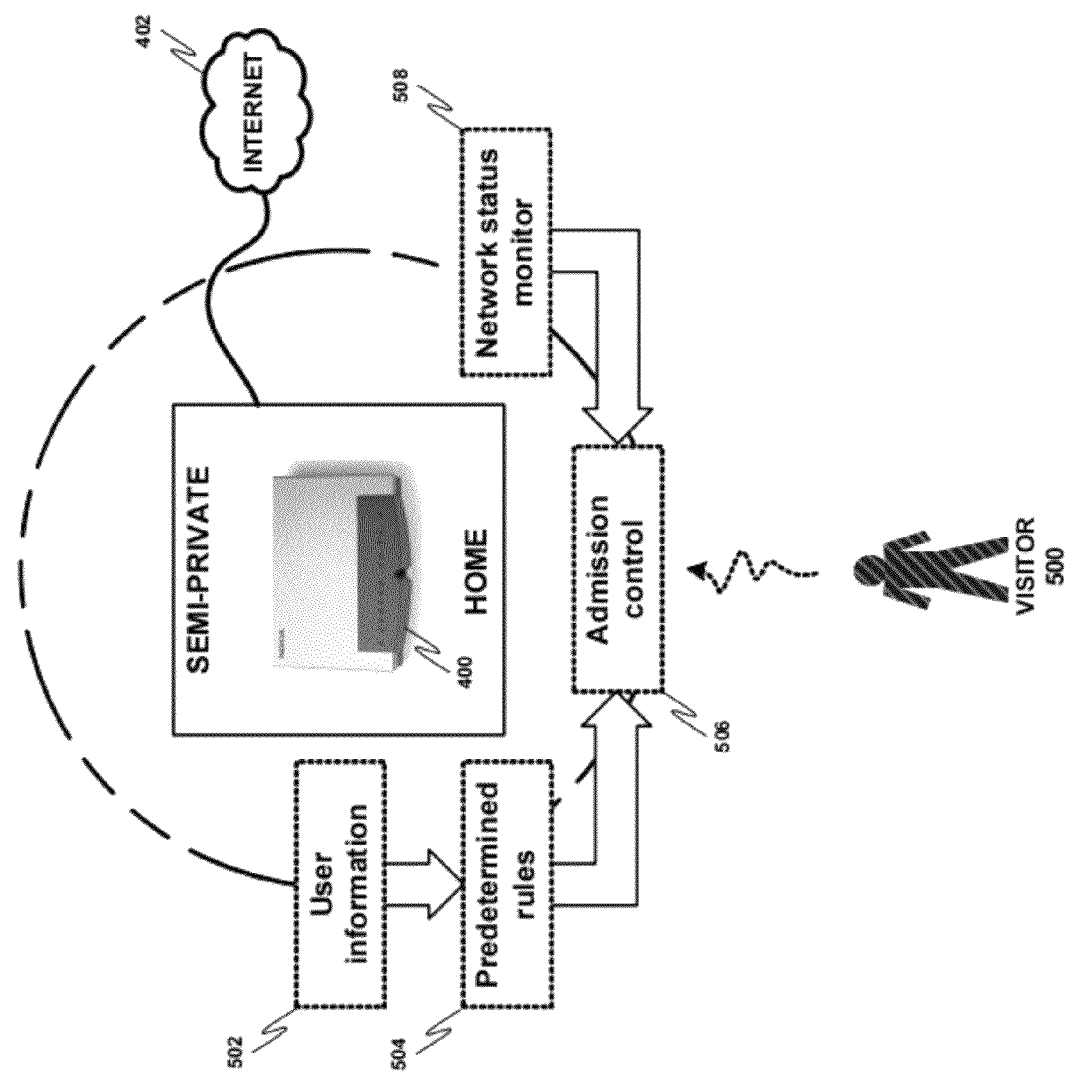
FIG. 5A discloses exemplary access and service information exchanged by an access point and a visitor in accordance with at least one embodiment of the present invention FIG. 5B discloses an exemplary stand-alone admission control structure in accordance with at least one embodiment of the present invention.

FIG. 5A includes an exemplary control structure for a stand-alone private short-range wireless network that may be configured by user 110 and locally controlled by AP 400. In this exemplary embodiment of the present invention, user 110 may establish preferences for network performance, user information 502, in order to formulate conditions, predetermined rules 504, for controlling the operation of the wireless network. User information 502 may, for example, define a minimum QoS level for the network to maintain with respect to user 110 while allowing visitors 500 to utilize the resources of AP 400. The minimum QoS level may then be converted into a set of rules 504 used to admit, deny and/or eject visitors from AP 400 when the QoS level drops below the minimum level defined by user 110. Admission control 506 may then utilize these rules to determine how to manage AP 400. Further, admission control 506 may utilize the network status monitor 508 of AP 400 in order to further customize the performance of the network. For example, if the network is not accessed by user 110 for a period of time, AP 400 may devote additional resources to visitors 500. On the other hand, if a security violation is detected, or user 110 is utilizing a certain communication-intensive application, all visitors may be ejected from the network in order to ensure that user 110 is not disturbed by visitors 500.

Aside from a user configuring their stand-alone network to conditionally admit visitors, another process by which a private wireless network may evolve into a semi-private wireless network is called registration. At any time after the private wireless network is initialized, user 110 may have the option to register the network with service/mobility domain server 510 in order to become a member of the service/mobility domain. Server 510 may, upon registration, record information about AP 400 of user 110. This information may include identification information, location information, capabilities information, rules governing use of AP 400, security information, user 110 specific information, etc. Server 510 may use this information in determining how and/or when to route users to a particular semi-private network, determining the overall availability in the service/mobility domain, what priority to grant user 110 when roaming to other semi-private networks, etc.

Figure 5B:
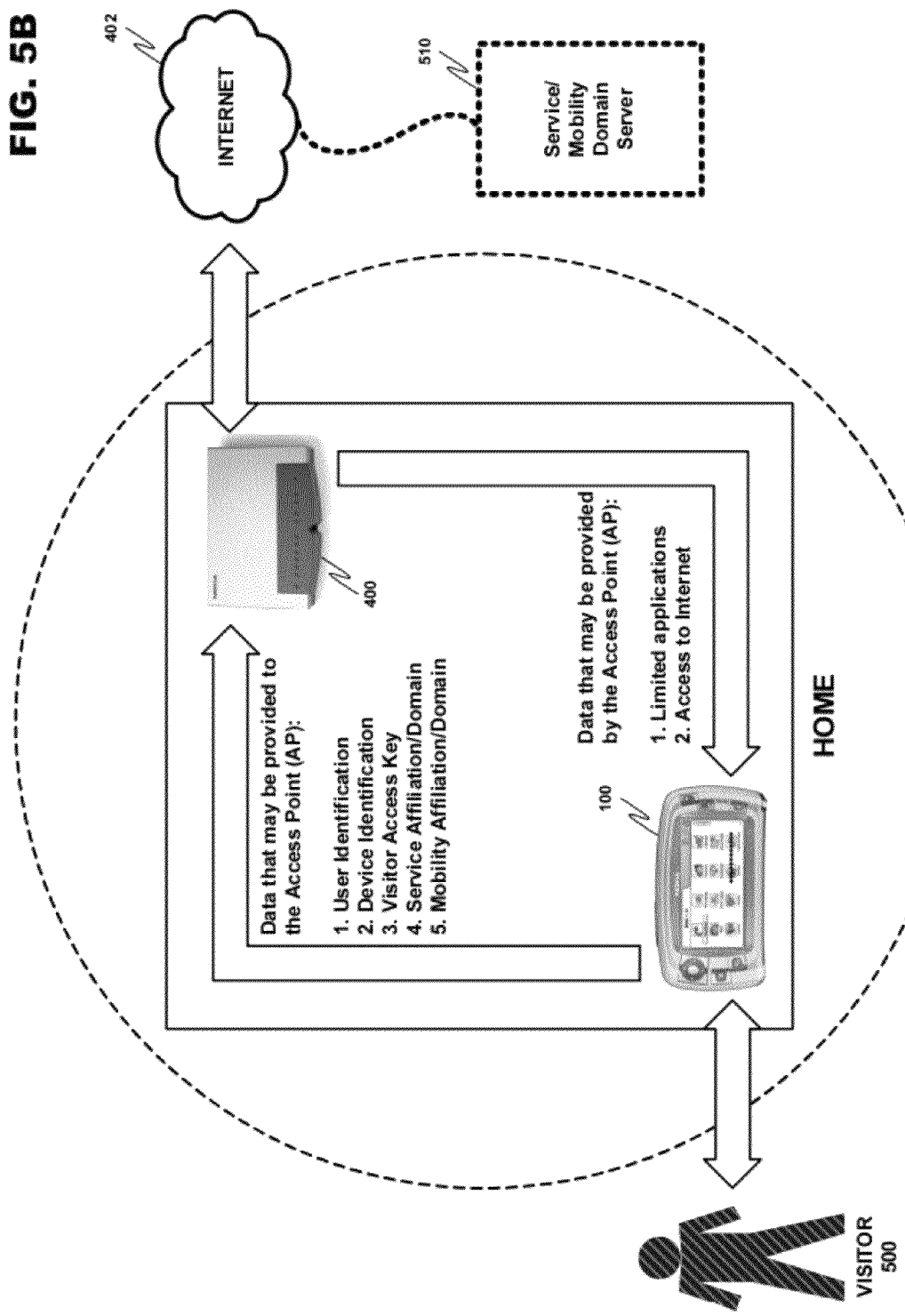
FIG. 5C discloses an example of a visitor being granted access to semi-private short-range wireless networks as organized by a service/mobility domain in accordance with at least one embodiment of the present invention.

The information exchange disclosed in FIG. 5B is similar to the transaction described in FIG. 4A, except in this example, visitor 500 may be granted access to a private wireless network by admission control 506 (e.g., in a stand-alone AP 400 configured by user 110) or by being a member of a service/mobility domain. In this case, visitor 500 may have not have previously accessed wireless resources through access point 400, and as a result, additional identification information may be required before admission is granted. Initially, all of the same user and/or device identification may be offered. In addition, if AP 400 is registered with service/mobility server 510, a visitor access key, service affiliation/domain information and mobility provider/domain information may also be required in order to establish that while visitor 500 is not an ordinary home user of AP 400, visitor 500 has additional credentials qualifying their WCD 100 for access to the network.

If admission is granted, wireless services may be provided to visitor 500 through WCD 100. These services may be a subset of the services available to a true home user. For example, FIG. 5A discloses that visitor 500 may be entitled to limited access to support for wireless applications or limited Internet access. These limitations, as will be discussed further below, may be established based on a variety of characteristics, customized to ensure that while user 110 may be willing to share access to AP 400, the home user's own expectations in using their personal broadband connection through AP 400 will not be compromised.

Figure 5C:
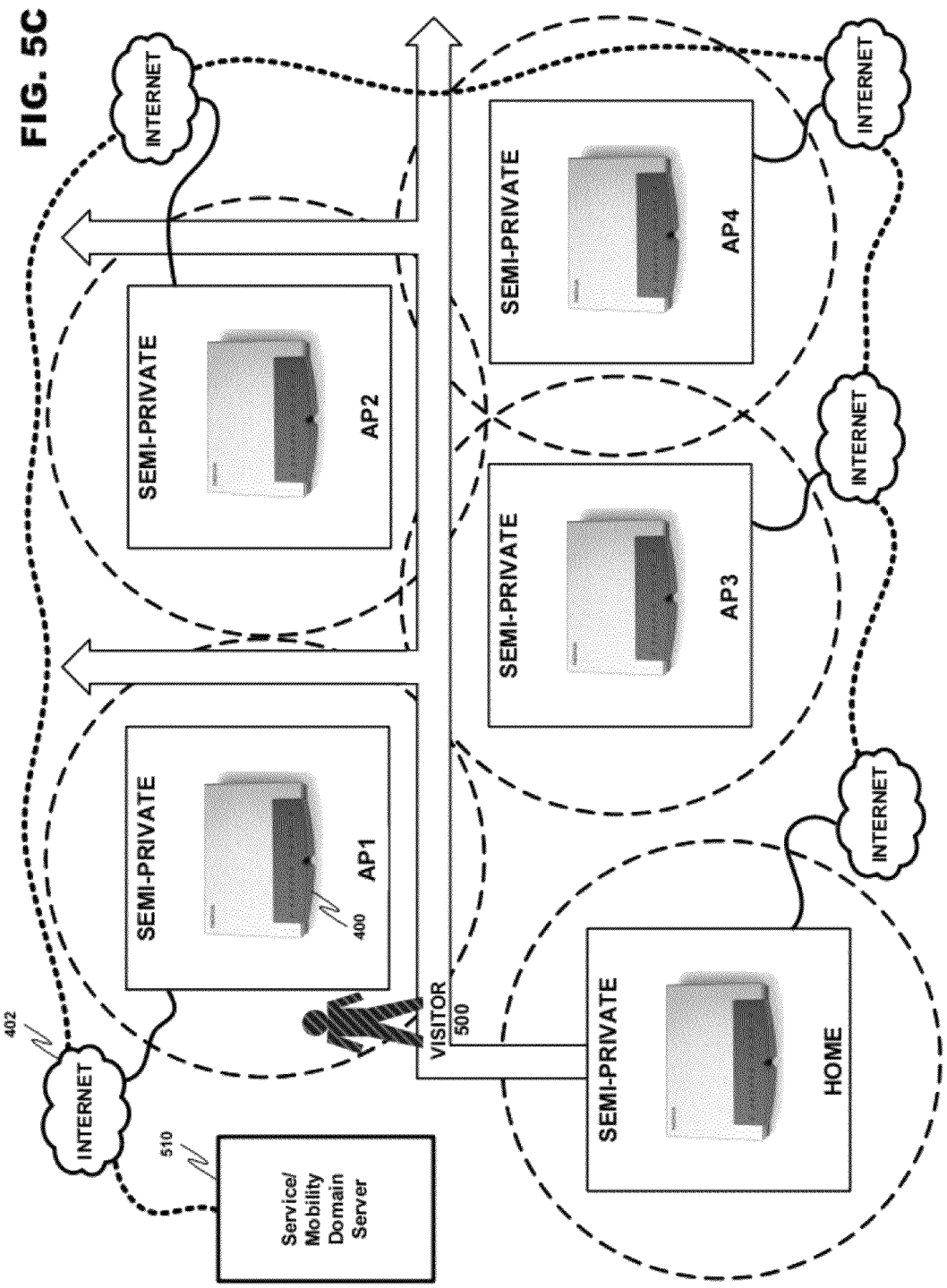

Referring now to FIG. 5C, wherein the service/mobility domain embodiment is disclosed, a visitor may be admitted on a conditional basis to one or more access points 400 (e.g., home AP and AP1 to AP4). As visitor 500 roams from the effective transmission range of one AP 400 to another, server 510 may be enabled to determine the current location of visitor 500, as well as other visitors 500 using the various short-range wireless networks. Alternatively, the WCD 100 may communicate directly to the server 510 and provide current location information. This tracking may occur as server 510 may be connected to each access point 400 through Internet 402. Internet 402, as previously stated, may in turn utilize a wired or wireless connection through a broadband connection to provide information to AP 400 for wireless distribution to at least two different classes of users: users 110 and visitors 500.

V. Conditional Admission to Semi-Private Wireless Networks

Figure 6A:
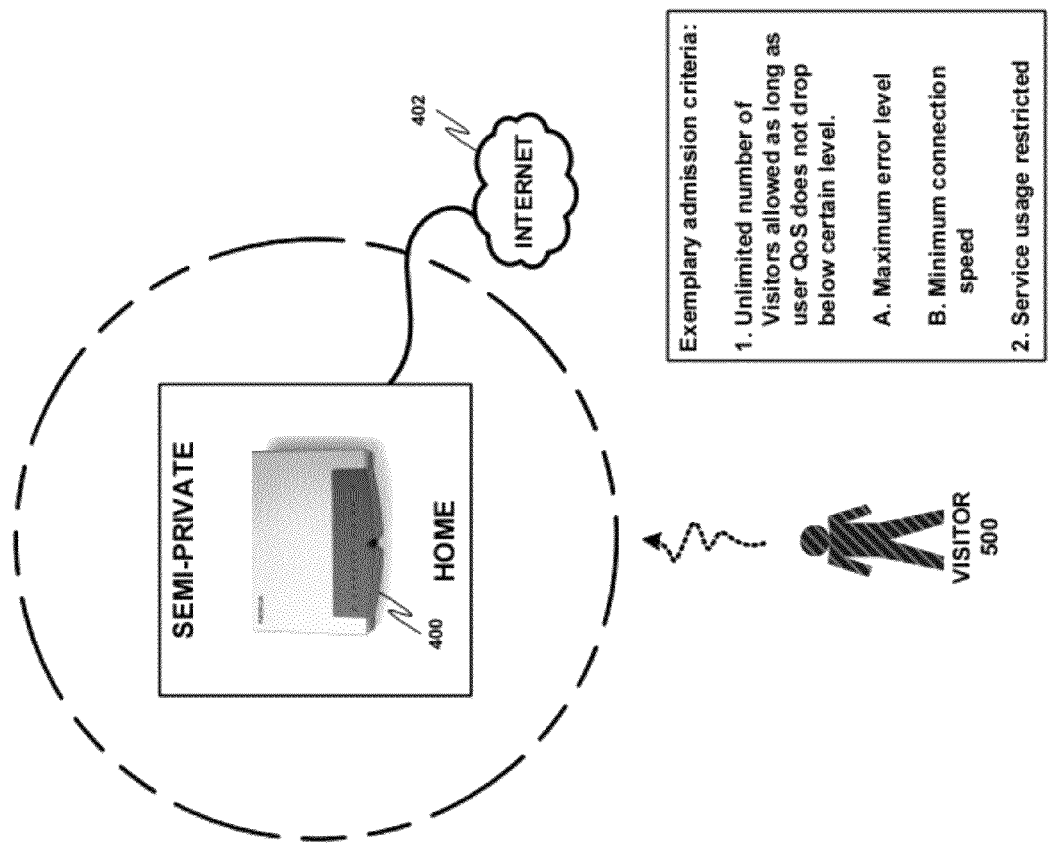
FIG. 6A discloses exemplary access control rules in a stand-alone local admission control system in accordance with at least one embodiment of the present invention.

In accordance with at least the stand-alone embodiment of the present invention, FIG. 6A discloses example admission criteria that may be utilized in determining whether a visitor should be admitted to a wireless short-range network being locally controlled by AP 400. In this configuration, an unlimited number of visitors may be admitted as long as a minimum QoS level is maintained with respect to user 110. The minimum QoS may be based on a multitude of quality of service measures, for example, a maximum error level for data being sent to and from AP 400, a minimum connection speed to maintain for communications from the WCD 100 of user 110, etc. Further, services available to visitors 500 may be restricted by user 110. These parameters may be constantly monitored by admission control 506, in order to determine whether to admit, deny or eject visitor 500 from the wireless network. In addition, admission control 506 may utilize information provided by network status monitor 508 in order to alter the behavior of AP 400, for example, by increasing or decreasing network availability for visitors 500, or shutting down AP 400 due to a security condition, user 110 requirement, etc.

Figure 6B:
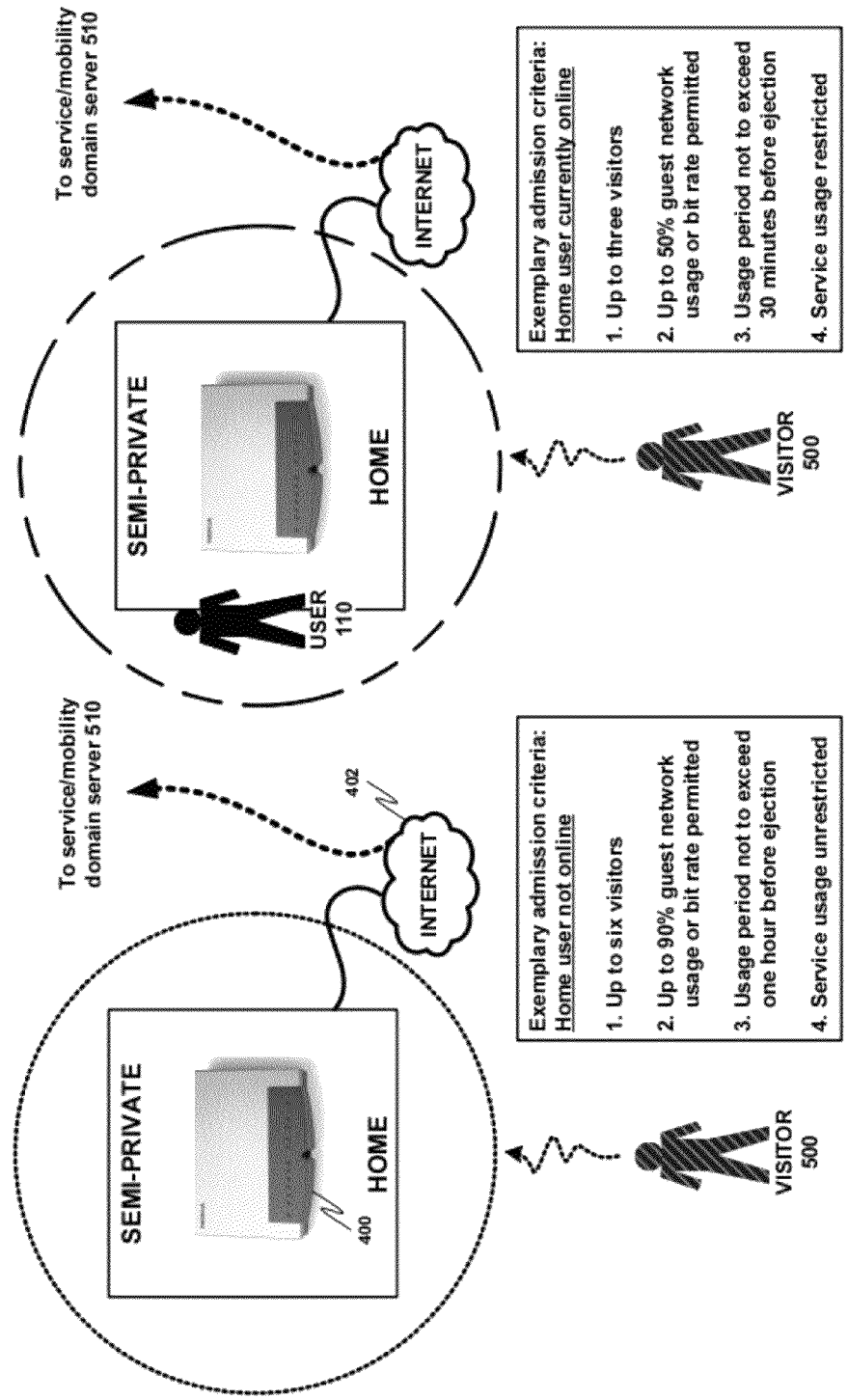
FIG. 6B discloses exemplary access control rules for at least two modes in semi-private wireless short-range wireless domains in accordance with at least one embodiment of the present invention.

In a further example of the present invention, visitor 500 may also be admitted to a registered network created by AP 400 on a conditional basis. The condition may be defined by a mode for AP 400. In at least one embodiment of the present invention, a mode may be changed by a control that senses whether user 110 is currently within effective transmission range and connected to their home AP 400. The control may be local to AP 400 (e.g., a software application running a control program) or may be derived from server 510. A first mode may be triggered when no user 110 is present, and a second mode is active during the presence of at least one user 110. An exemplary scenario is shown in FIG. 6B.

In a first exemplary mode for a registered semi-private short-range wireless network, user 110 is not present. This mode may occur, for example, when user 110 activates AP 400 and then registers the network with server 510 before leaving home, the office, etc. It should also be noted that the registration may occur manually or automatically without requiring user intervention. In this mode, no allowance or allocation is required for user 110, so most or all of the resources of AP 400 is available to visitor 500. As disclosed in FIG. 6B, AP 400 operating in this mode may admit visitor 500 based on one or more use characteristics or admission criteria. The admission criteria may include number of users (e.g., up to six (6) visitors 500 may use AP 400 simultaneously), bandwidth usage (e.g., visitors 500 may use a total of 90% of the available bandwidth or may access AP 400 resources at a predetermined bit rate), Duration (e.g., visitors 500 may use AP 400 continuously for 1 hour before ejection, or may utilize access point between the hours of 9:00 AM and 5:00 PM) and service usage (visitors 500 may utilize Internet, but only to access websites with a certain extension, may not access hardware resources connected to AP 400, etc.)

Alternatively, a more restrictive mode may be triggered when user 110 is present in order to ensure a minimum QoS level of network resources for the user. This exemplary situation is also shown in FIG. 6B, wherein user 110 is present within effective transmission range of their home AP 400. Here the number of visitors 500 allowed to simultaneously access AP 400 has been reduced to three (3). If a situation exists where more than three visitors 500 were connected under the auspices of the previous mode, and user 110 returns and connects to AP 400, then three of the visitors may be ejected based on priority, duration of connection, etc. in order to bring AP 400 into conformance with the rules of the particular operating mode. Other limiting factors may include reducing the allowed bandwidth or bit rate for visitors 500 to 50%, reducing the duration allowances to 30 minutes of continual usage before ejection, and reduced access privileges. Where visitors 500 may have been able to access unlimited types of electronic media via AP 400 when no user 110 was present, now visitors 500 may be limited to only being able to access Internet resources (no hardware resources or wireless application support such as VoIP), no streaming of audio or video media, no downloading of video media at all, no activation of ActiveX controls, etc.

Security for AP 400, and the private and/or confidential information of user 110, may also be addressed with rules active regardless of the present mode. For example, a visitor 500 may access, by mistake or with malicious intent, information that user 110 intends to keep confidential. If such a breach is detected, AP 400 or server 510 may immediately alter mode to enter a safe mode. The safe mode may, for example, expel all visitors 500 from AP 400. Alternatively, the wireless network may enter the mode typically triggered by the presence of one or more users 110. This mode, which may be somewhat more restricted, may secure resources within the semi-private short-range wireless network to a degree satisfying user 110.

Now referring to FIG. 6C, an example of service/mobility domain management in accordance with at least one embodiment of the present invention is disclosed. The community of people exchanging the provision of short-range wireless resources for the ability to share the available resources of other community members may constantly change as access points 400 are registered and deregistered with server 510. As a result, visitor 500 may benefit from advisory information as to the location of available resources in the service/mobility domain. In FIG. 6C, three exemplary access points 400 are shown. These wireless networks each differ in the effective transmission range of AP 400 (e.g., based on the strength and location of each AP 400), the number of users 110 currently utilizing each AP 400, and the number of other visitors currently connected to each AP 400. In view of these varied conditions, visitor 500 may contact server 510 in order to be directed to available resources, or server 510 may redirect WCD automatically without WCD initiated contact based on neighboring wireless network information collected by server 510. This contact may occur via short-range communication to an available AP 400, or may occur via long-range communication over any of the aforementioned mediums. Information 600 provided to visitors 500 may include a listing of the registered access points 400 in the immediate area (e.g. SSID/BSSID in case of WLAN AP), the location of each AP 400, the availability of each AP 400 on a number of available visitor spots basis, on a percentage of available bandwidth/QoS for visitors basis, on a services provided to visitors basis (not pictured), etc. Visitor 500 may then be able to select one of the access points 400 with availability, or be told to select one of the access points by server 510 (network controlled mobility), and optionally receive instructions for getting to AP 400. WCD 100 may also automatically determine, based on existing information, the location of AP 400. The instructions may be given in absolute terms (e.g., longitude and latitude, street address, etc.) or in relative terms as directional instructions.

In a further example of the present invention, the minimum QoS level provided to user 110 may also be configurable by a superior entity, such as an equipment owner and/or service provider for AP 400. In this scenario, the minimum QoS level guaranteed for user 110 may be determined by the lease or contract to rent AP 400. An example agreement may set forth that the more user 110 pays to lease or rent AP 400, the higher the minimum guaranteed QoS level provided to user 110 on AP 400 (e.g., a "deluxe" package would be more expensive than other options, but may also guarantee user 110 very high service quality). The service provider could then utilize the remaining bandwidth from AP 400 to provide resources to visitors 500 that also have contracts with the service provider. This would give the service provider an additional service to market wherein subscribers are provided with both home and mobile wireless support.

In addition, as previously stated, the present invention is not limited to any particular type of WCD. Therefore, a multitude of applications are possible. In one example, user 110 may operate AP 400 for personal access, and to provide resources to known visitors 500. For example, user 110 may employ a wider range WLAN access point operating from their home to provide wireless resources to family, neighbors, friends, etc. User 110 may then further classify visitors 500 by type of device. Wireless monitoring devices for home security, fire/smoke/flood detection, child tracking, etc. may be given a higher priority level over visitors 500 that are more recreational in nature. User 110 may then receive compensation from known visitors 500 to help pay for leased services, for example, broadband access connected to AP 400.

Now referring to FIG. 7, the admission control process for an exemplary stand-alone wireless short-range network in accordance with at least one embodiment of the present invention is disclosed. In step 700, a user determines rules for controlling admission to their private short-range wireless network. These rules may be based on preferences for minimum required quality of service levels for user 110, or may be based on security protections, time of day, duration, etc. These rules are activated in the form of a admission control in step 702 in order to determine whether to admit, deny or eject visitors 500 from the now semi-private network. In step 704, a visitor seeks admission to the wireless network formed by at least access point 400. The access control determines in step 706 whether the visitor 500 may be admitted based on the predetermined rules. If the visitor 500 may be admitted to the network (step 708), the user 500 may access resources from AP 400. The admission controller may continue to monitor visitor 500 in step 710 while connected to the network in order to determine if a condition has occurred resulting in the required ejection of visitor 500. If such a condition occurs (e.g., security breach, necessity for full bandwidth of AP 400 for user 110, etc.) then in step 712 the visitor 500 will be removed from the wireless network and returned to step 706 where admission (in this case re-admission) is tested. Alternatively, if visitor 500 is denied admission to access resources from AP 400 (step 714), then the visitor 500 is returned to a state where admission to the wireless network may again be requested at a later time (step 704).

Figure 8B:
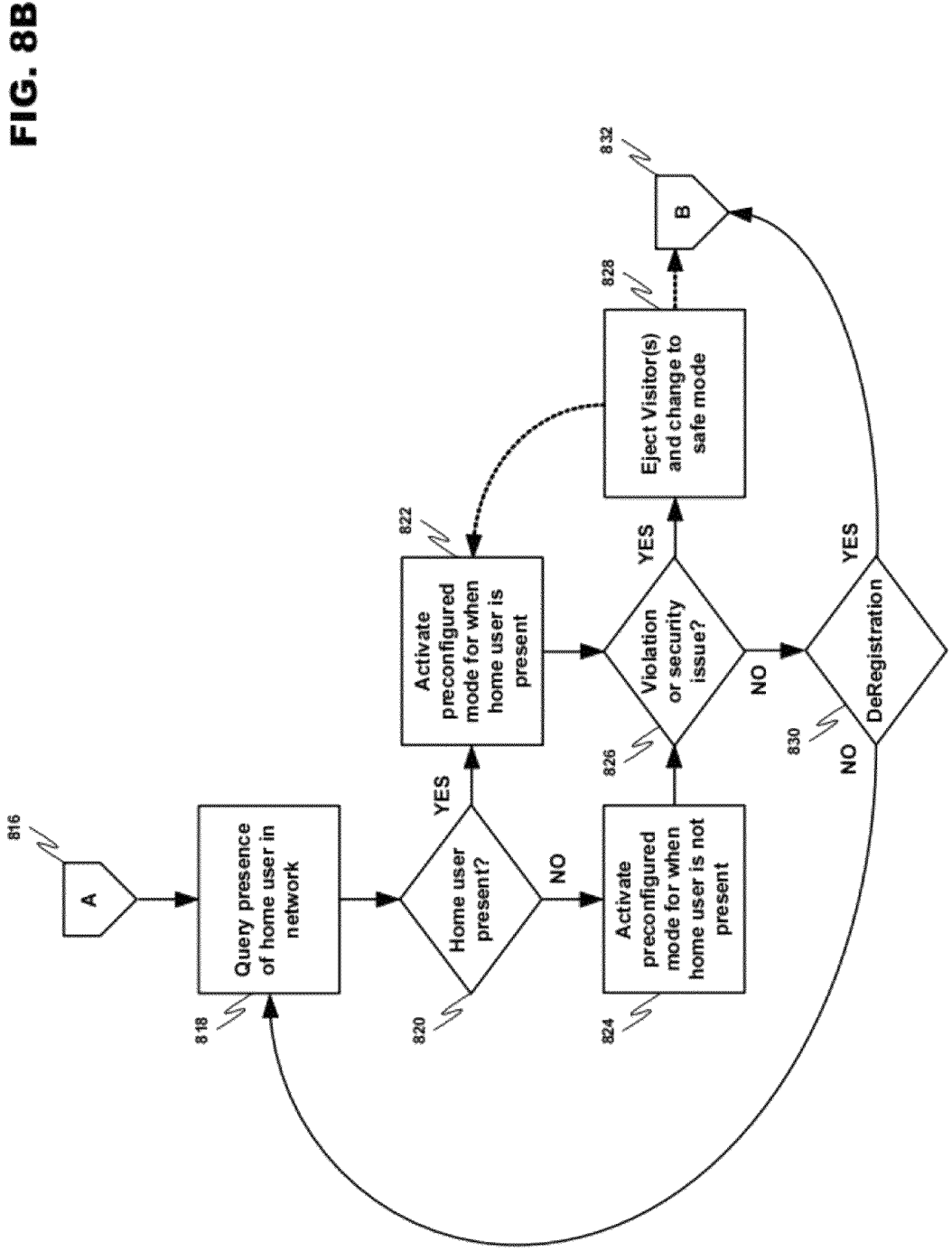
FIG. 8B discloses a flow chart describing an exemplary semi-private short-range wireless network mode control process in accordance with at least one embodiment of the present invention.

FIG. 8A includes two flowcharts describing the exemplary processes by which an AP 400 is registered or deregistered in accordance with the service/mobility embodiment of the present invention. These flowcharts integrate with the flowchart provided in FIG. 8B wherein the process of mode control for a semi-private short-range wireless network is discussed. Beginning with step 800, AP 400 may be activated by user 110. Activation may be as simple as turning on a wireless router, or may require additional steps to connect AP 400 to Internet 402 via a high-speed broadband connection. User 110 must then decide whether to register AP 400 in the service/mobility domain (step 802) or AP 400 may register automatically based on its configuration (manually configured by user or provisioned, for example, by a service provider). In the case of automatic registration, AP 400 may register itself based on something other than activation, for example, when the available resources reaches a level (e.g., as defined by user 110) able to support visitors 500 also using the network. If user 110 prefers not to share resources, then in step 804 the short-range wireless network remains private until it is later disabled in step 806 (in which case user 110 may locally configure admission control as explained above). However, if user 110 does desire to join the service/mobility domain, in step 808 the user registers AP 400 with server 510. Registration may include uploading information to server 510 including usage identification information, location information (GPS coordinates, street address, used IP network protocol mask/identities etc.), usage permission rules (e.g., modes), etc. Server 510 may use this information to determine the benefits that should be attributed to user 110 when roaming (e.g., when user 110 becomes a visitor 500 to other access points 400), to direct visitors 500 when roaming within transmission range of AP 400, etc. Server 510 may then reconfigure AP 400 for integration into the service/mobility domain in step 810, and AP 400 enters a semi-private mode (step 812) controlled either locally or remotely by server 510.

Step 814 refers to FIG. 8B, wherein an exemplary mode control process is disclosed. Step 818 begins with the semi-private short-range wireless network enabled to provide resources to visitors 500. In step 820, AP 400 checks to see if one or more users 110 are present and communicating with the semi-private network. If at least one user 110 is present, then in step 822 a preconfigured operational mode pertaining to when at least one user 110 is present in enabled. Alternatively, in step 824 a mode allowing wider access to visitors 500 may be enabled. In step 826 (which may occur after either mode is triggered) security may be checked for AP 400. If any security violations are detected, step 828, AP 400 may enter a safe mode by, for example, either entering the mode when a user is present, or proceeding to deregistering AP 400 from the service/mobility domain (represented by dotted arrows). If no security violation exists, then a check is made to determine if deregistration has been requested in step 830. If there is no desire to remove AP 400 from the service/mobility domain, then the mode control process reinitializes back to step 818. If there is a desire to convert AP 400 back into a private network, then reference B (step 832) returns to FIG. 8A for deregistration.

In step 834 and 836 the deregistration process begins. Deregistration may occur for example during power off of AP or when there are not enough visitor resources in private wireless network. Any remaining visitor devices are ejected from the semi-private short-range wireless network in step 838. Server 510 is then notified that AP 400 is leaving the service/mobility domain in step 840. User 110 may decide that the registration data should be removed from server 510 in step 842. Removing this information may be considered a safety precaution to prevent other people from obtaining identification information or other relevant information regarding AP 400. If the information is to be removed, then in step 844 the information is deleted and deregistration is completed. Otherwise, in step 846 deregistration is completed without deleting the information. Further, the process may reinitiate whenever user 110 re-activates AP 400 (as designated by on page reference points 848 and 850).

The present invention may be considered an improvement over the prior art for at least the functionality it affords by allowing a private user to leverage purchased wireless network access that they may not be currently using in order to be able roam and borrow the shared resources of other people's networks. The present invention includes additional functionality that adapts this network sharing to accommodate when a user is connected to their own wireless broadband connection, so that the resources may be automatically reallocated to preserve at least a minimum amount of bandwidth so that the user may still have adequate usage of their own equipment. In this way, a user may feel better about sharing, and will be more likely to participate with other people in a wireless access sharing community.

Figure 9:
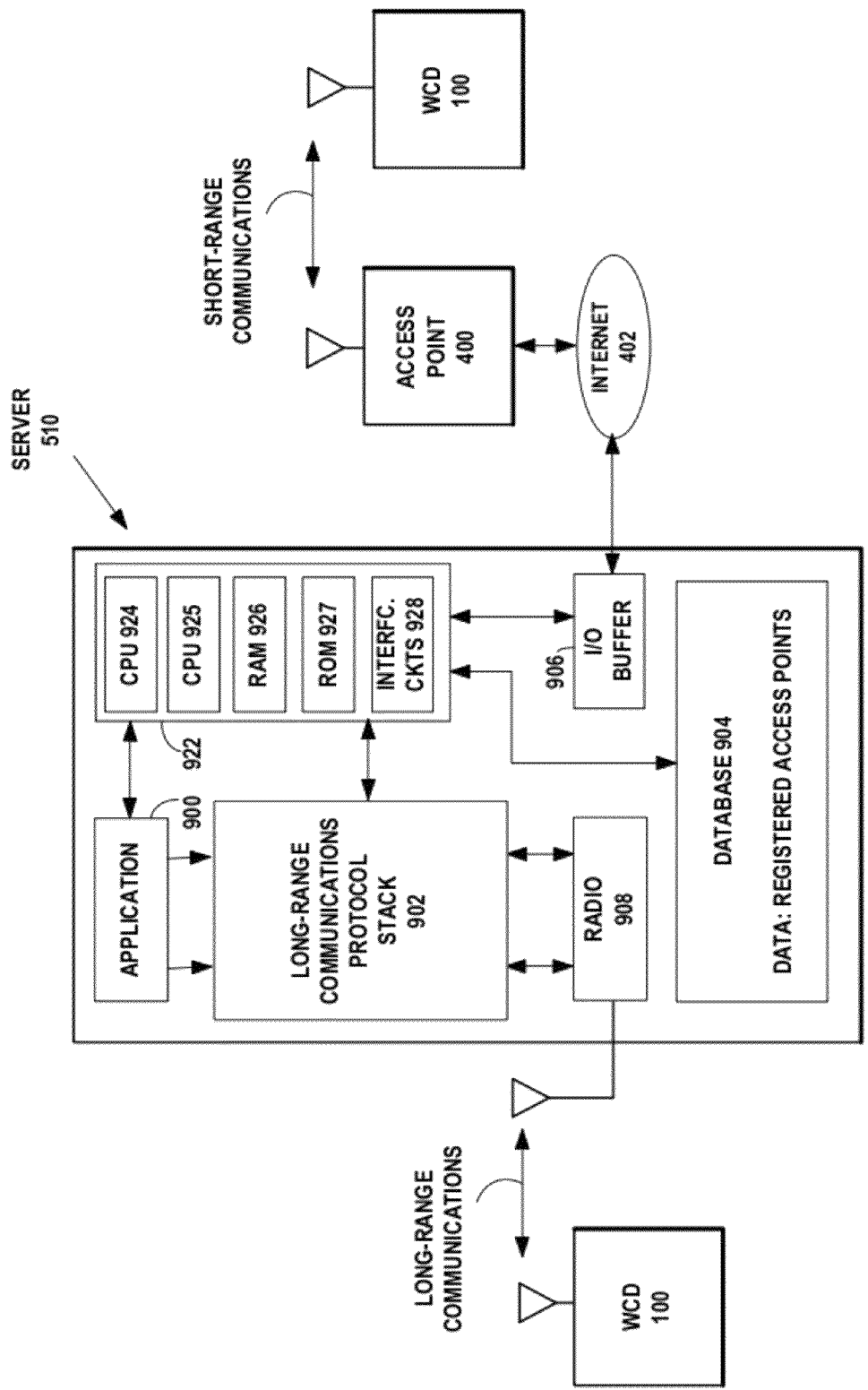
FIG. 9 is a functional block diagram of the server 510, in accordance with an example embodiment of the invention.

A FIG. 9 is a functional block diagram of the server 510, in accordance with an example embodiment of the invention. In accordance with example embodiments of the invention, the server 510 includes a processor 922 that includes a single core CPU or multiple core central processing unit (CPU) 924 and 925, a random access memory (RAM) 926, a read only memory (ROM) 927, and interface circuits 928 to interface with one or more radio transceivers 908, battery or house power sources, keyboard, display, etc. Radio transceivers 908 may communicate over a long-range communications link with the WCD 100. Input/output buffer 906 connects to the Internet 402, which connects to the access point 400. The access point 400 may communicate over a short-range link with the WCD 100. The database 904 may store and maintain data, such as resource information about the registered access points 400. The RAM and ROM can be removable memory devices such as smart cards, SIMs, WIMs, semiconductor memories such as RAM, ROM, PROMS, flash memory devices, etc. The program application 900 and protocol stack 902 may be computer code instructions stored in the RAM and/or ROM memory of the processor 922, which when executed by the central processing units (CPU), carry out the functions of the example embodiments of the invention.

FIG. 10A is an example flow diagram of an example embodiment of a method for a server 510 ensuring quality of service. The steps of the flow diagram may represent computer code instructions stored in the RAM and/or ROM memory of the server 510, which when executed by the central processing units (CPU), carry out the functions of an example embodiment of the invention. The steps may be carried out in another order than shown and individual steps may be combined or separated into component steps.

Step 1002: maintaining by a network server, connection information, including at least one of available quality of service (QoS), a record of access points, or a record of services provided, for one or more access points registered with the server in a network;

Step 1004: receiving at the server, a request from a wireless terminal device, requesting information on accessing wireless resources available from one or more access points;

Step 1006: providing by the server to the wireless terminal device, connection information including at least one of available quality of service (QoS), an indication of the access points, or an indication of services provided by one or more access points registered with the server; and Step 1008: allowing by the server, the wireless terminal device to select one of the available access points.

Figure 10B:
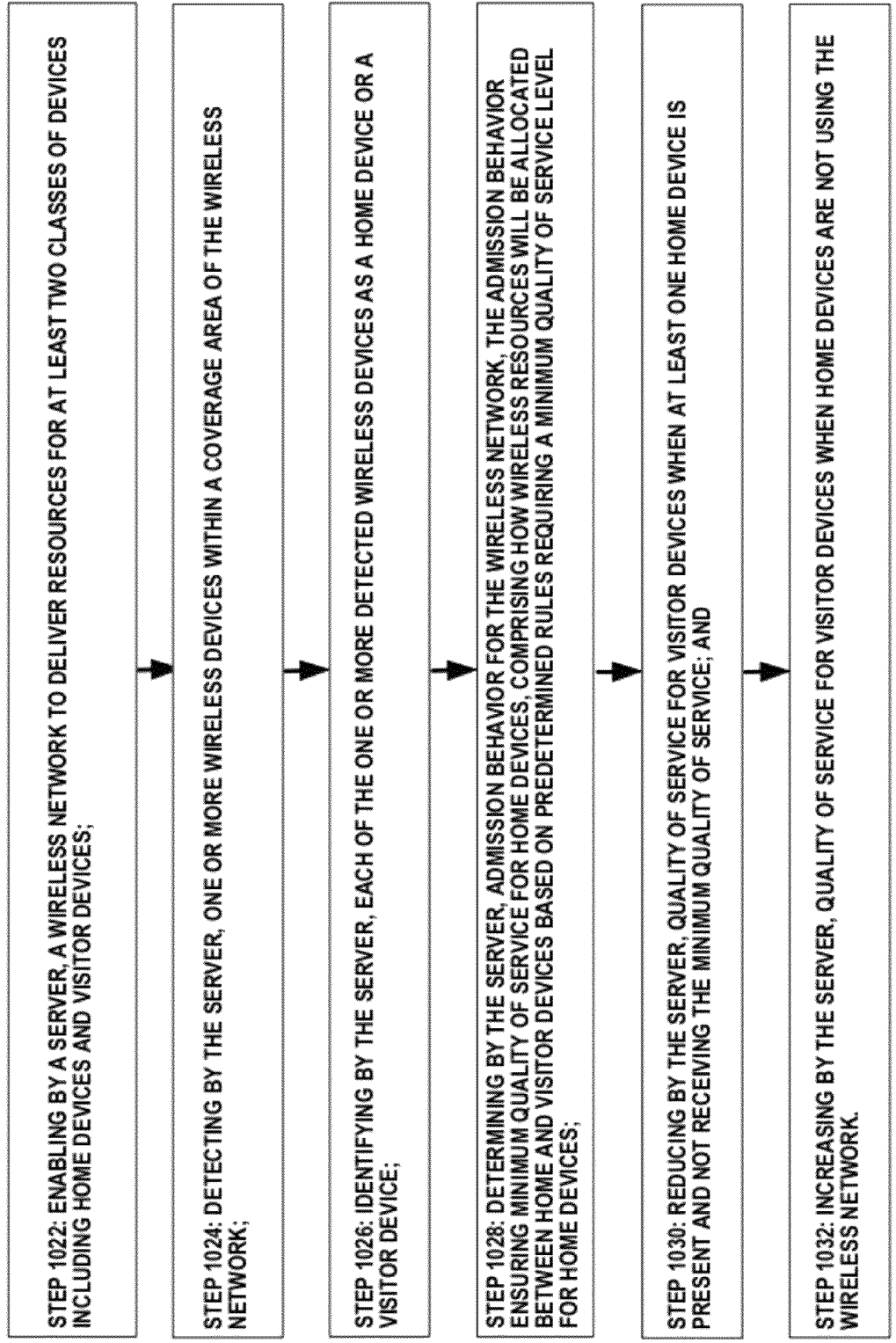
FIG. 10B is an example flow diagram of an example embodiment of a method for a server 510 ensuring quality of service, in accordance with an example embodiment of the invention.

FIG. 10B is an example flow diagram of an example embodiment of a method for a server 510 ensuring quality of service. The steps of the flow diagram may represent computer code instructions stored in the RAM and/or ROM memory of the server 510, which when executed by the central processing units (CPU), carry out the functions of an example embodiment of the invention. The steps may be carried out in another order than shown and individual steps may be combined or separated into component steps.

Step 1022: enabling by a server, a wireless network to deliver resources for at least two classes of devices including home devices and visitor devices;

Step 1024: detecting by the server, one or more wireless devices within a coverage area of the wireless network;

Step 1026: identifying by the server, each of the one or more detected wireless devices as a home device or a visitor device;

Step 1028: determining by the server, admission behavior for the wireless network, the admission behavior ensuring minimum quality of service for home devices, comprising how wireless resources will be allocated between home and visitor devices based on predetermined rules requiring a minimum quality of service level for home devices;

Step 1030: reducing by the server, quality of service for visitor devices when at least one home device is present and not receiving the minimum quality of service; and Step 1032: increasing by the server, quality of service for visitor devices when home devices are not using the wireless network.

Figure 10C:
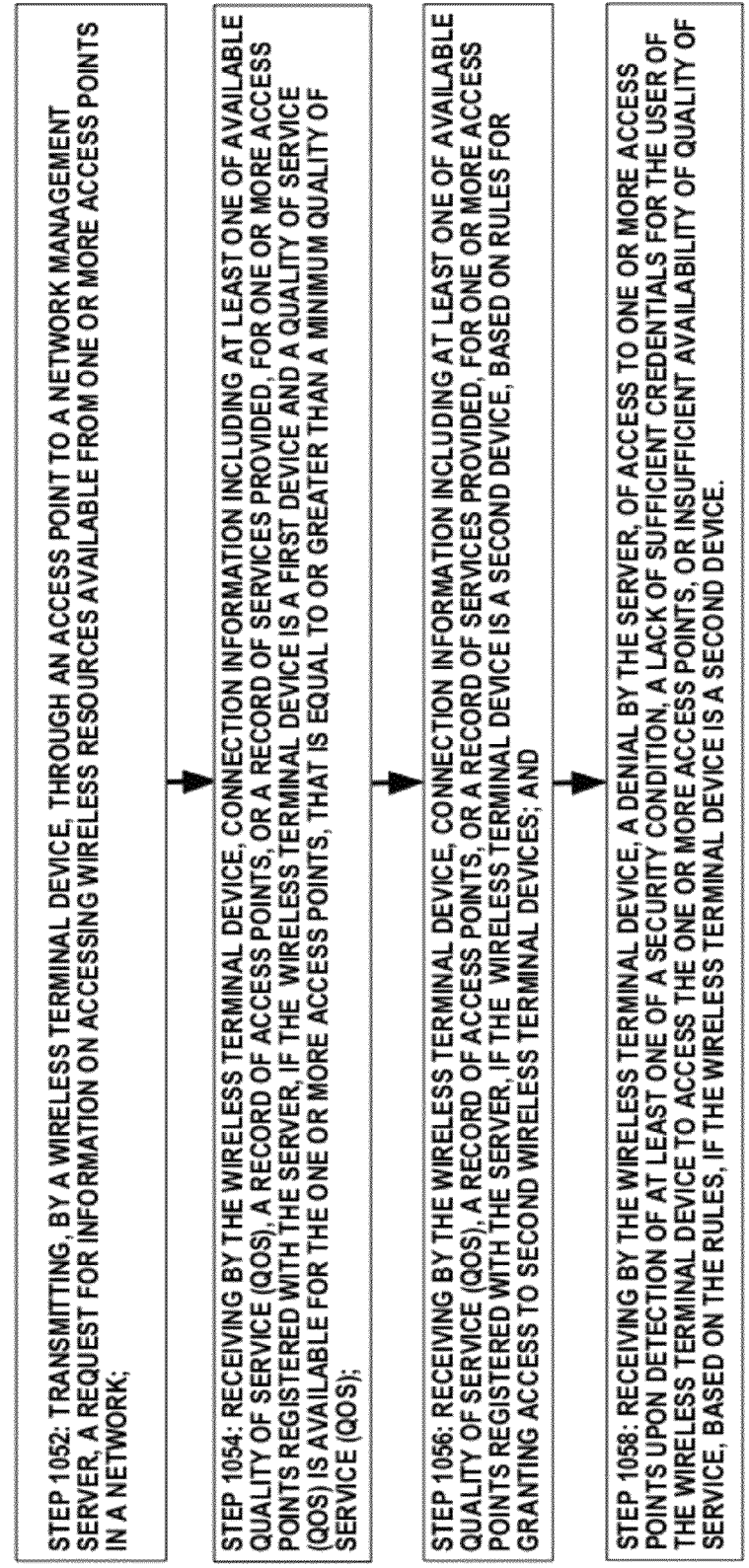
FIG. 10C is an example flow diagram of an example embodiment of a method for a wireless terminal device 100 obtaining ensured quality of service, in accordance with an example embodiment of the invention.

FIG. 10C is an example flow diagram of an example embodiment of a method for a wireless terminal device 100 obtaining ensured quality of service. The steps of the flow diagram may represent computer code instructions stored in the memory of the wireless terminal device 100, which when executed by the processor, carry out the functions of an example embodiment of the invention. The steps may be carried out in another order than shown and individual steps may be combined or separated into component steps.

Step 1052: transmitting, by a wireless terminal device, through an access point to a network management server, a request for information on accessing wireless resources available from one or more access points in a network;

Step 1054: receiving by the wireless terminal device, connection information including at least one of available quality of service (QoS), a record of access points, or a record of services provided, for one or more access points registered with the server, if the wireless terminal device is a first device and a quality of service (QoS) is available for the one or more access points, that is equal to or greater than a minimum quality of service (QoS);

Step 1056: receiving by the wireless terminal device, connection information including at least one of available quality of service (QoS), a record of access points, or a record of services provided, for one or more access points registered with the server, if the wireless terminal device is a second device, based on rules for granting access to second wireless terminal devices; and Step 1058: receiving by the wireless terminal device, a denial by the server, of access to one or more access points upon detection of at least one of a security condition, a lack of sufficient credentials for the user of the wireless terminal device to access the one or more access points, or insufficient availability of quality of service, based on the rules, if the wireless terminal device is a second device.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

The invention claimed is:

1. A method comprising:
maintaining by a network server, connection information, including at least one of available quality of service, a record of access points, a record of services provided, for one or more access points registered with the server in a network, rules for granting access to a wireless terminal device for network access, and rules for granting access to second wireless terminal devices authorized for shared network access, for one or more access points registered with the server;
receiving at the server, a request from a wireless terminal device, requesting information on accessing wireless resources available from one or more access points;
providing by the server to the wireless terminal device, connection information including at least one of available quality of service, an indication of the access points, or an indication of services provided by one or more access points registered with the server;
allowing by the server, the wireless terminal device to select one of the available access points;
denying by the server, access to one or more access points for the wireless terminal device, based upon detection of violation of one or more of the rules for granting access to a wireless terminal device for network access, if the wireless terminal device is a second wireless terminal device.

2. The method of claim 1, further comprising:
transmitting by the server, a command to the wireless terminal device to select one of the access points.

3. The method of claim 1, wherein the server receives the request from the wireless terminal device over at least one of a long-range wireless communications link or over a short-range wireless communications link via an access point.

4. A method comprising:
maintaining by a network server, connection information, including at least one of available quality of service, a record of access points, or a record of services provided, for one or more access points registered with the server in a network;
receiving at the server, a request from a wireless terminal device, requesting information on accessing wireless resources available from one or more access points;
providing by the server to the wireless terminal device, connection information including at least one of available quality of service, an indication of the access points, or an indication of services provided by one or more access points registered with the server;
allowing by the server, the wireless terminal device to select one of the available access points;
wherein the network server maintains information specifying a minimum quality of service for first wireless terminal devices authorized for private network access, and rules for granting access to second wireless terminal devices authorized for shared network access, for one or more access points registered with the server; and
denying by the server, access to one or more access points for the wireless terminal device upon detection of at least one of a security condition, a lack of sufficient credentials for the user of the wireless terminal device to access the one or more access points, or insufficient availability of quality of service, based on the rules, if the wireless terminal device is a second wireless terminal device.

5. The method of claim 1, wherein the network is a short-range communications network including at least a Bluetooth network, BluLite network, WLAN network, UWB network, Zigbee network, UHF RFID network, or Wireless USB.

6. An apparatus comprising:
at least one processor;
at least one memory including computer program code;
the at least one memory and the computer program code configured to, with the at least one processor, cause the apparatus at least to:
maintain connection information, including at least one of available quality of service, a record of access points, a record of services provided, for one or more access points registered with the apparatus in a network, rules for granting access to a wireless terminal device for network access, and rules for granting access to second wireless terminal devices authorized for shared network access, for one or more access points registered with the apparatus;
receive a request from a wireless terminal device, requesting information on accessing wireless resources available from one or more access points;
provide to the wireless terminal device, connection information including at least one of available quality of service, an indication of the access points, or an indication of services provided by one or more access points registered with the apparatus;
allow the wireless terminal device to select one of the available access points; and
deny access to one or more access points for the wireless terminal device, based upon detection of violation of one or more of the rules for granting access to a wireless terminal device for network access, if the wireless terminal device is a second wireless terminal device.

7. The apparatus of claim 6, further comprising:
the at least one memory and the computer program code configured to, with the at least one processor, cause the apparatus at least to:
transmit a command to the wireless terminal device to select one of the access points.

8. The apparatus of claim 6, wherein the apparatus receives the request from the wireless terminal device over at least one of a long-range wireless communications link or over a short-range wireless communications link via an access point.

9. An apparatus comprising:
at least one processor;
at least one memory including computer program code;
the at least one memory and the computer program code configured to, with the at least one processor, cause the apparatus at least to:
maintain connection information, including at least one of available quality of service, a record of access points, or a record of services provided, for one or more access points registered with the apparatus in a network;
receive a request from a wireless terminal device, requesting information on accessing wireless resources available from one or more access points;
provide to the wireless terminal device, connection information including at least one of available quality of service, an indication of the access points, or an indication of services provided by one or more access points registered with the apparatus;
allow the wireless terminal device to select one of the available access points;

wherein the apparatus maintains information specifying a minimum quality of service for first wireless terminal devices authorized for private network access, and rules for granting access to second wireless terminal devices authorized for shared network access, for one or more access points registered with the apparatus; and the at least one memory and the computer program code configured to, with the at least one processor, cause the apparatus at least to:

deny access to one or more access points for the wireless terminal device upon detection of at least one of a security condition, a lack of sufficient credentials for the user of the wireless terminal device to access the one or more access points, or insufficient availability of quality of service, based on the rules, if the wireless terminal device is a second wireless terminal device.

10. A method comprising:

transmitting, by a wireless terminal device, through an access point to a network management server, a request for information on accessing wireless resources available from one or more access points in a network;

receiving by the wireless terminal device, connection information including at least one of available quality of service, a record of access points, or a record of services provided, for one or more access points registered with the server, if the wireless terminal device is a first device and a quality of service is available for the one or more access points, that is equal to or greater than a minimum quality of service;

receiving by the wireless terminal device, connection information including at least one of available quality of service, a record of access points, or a record of services provided, for one or more access points registered with the server, if the wireless terminal device is a second device, based on rules for granting access to second wireless terminal devices; and receiving by the wireless terminal device, a denial by the server, of access to one or more access points upon detection of at least one of a security condition, a lack of sufficient credentials for the user of the wireless terminal device to access the one or more access points, or insufficient availability of quality of service, based on the rules, if the wireless terminal device is a second device.

11. The method of claim 10, wherein the wireless terminal device transmits the request to the server over at least one of a long-range wireless communications link or over a short-range wireless communications link via an access point.

12. The method of claim 10, wherein the minimum quality of service is provided by an access point for first wireless terminal devices connected to the access point and a remaining portion of available bandwidth is provided by the access point for second wireless terminal devices connected to the access point, based on at least one of rules or an agreement between an owner of the access point and a service provider.

13. The method of claim 10, wherein the network is a short-range communications network including at least a Bluetooth network, BluLite network, WLAN network, UWB network, Zigbee network, UHF RFID network, or Wireless USB.

14. An apparatus, comprising:

at least one processor;

at least one communication module;

at least one memory including computer program code;

the at least one memory and the computer program code configured to, with the at least one processor, cause the apparatus at least to:

transmit through an access point to a network management server, a request for information on accessing wireless resources available from one or more access points;

receive connection information including at least one of available quality of service, a record of access points, or a record of services provided, for one or more access points registered with the server, if the apparatus is a first device and a quality of service is available for the one or more access points, that is equal to or greater than a minimum quality of service;

receive connection information including at least one of available quality of service, a record of access points, or a record of services provided, for one or more access points registered with the server, if the apparatus is a second device, based on rules for granting access to second wireless terminal devices; and receive a denial by the server, of access to one or more access points upon detection of at least one of a security condition, a lack of sufficient credentials for the user of the wireless terminal device to access the one or more access points, or insufficient availability of quality of service, based on the rules, if the wireless terminal device is a second device.

15. The apparatus of claim 14, wherein the apparatus transmits the request to the server over at least one of a long-range wireless communications link or over a short-range wireless communications link via an access point.

16. The apparatus of claim 14, wherein the minimum quality of service is provided by an access point for first wireless terminal devices connected to the access point and a remaining portion of available bandwidth is provided by the access point for second wireless terminal devices connected to the access point, based on at least one of rules or an agreement between an owner of the access point and a service provider.

* * * * *